(12) United States Patent
Shimada et al.

(10) Patent No.: US 9,565,064 B2
(45) Date of Patent: Feb. 7, 2017

(54) FRAME TRANSMISSION APPARATUS AND METHOD FOR CHECKING NORMALITY

(71) Applicants: NIPPON TELEGRAPH AND TELEPHONE CORPORATION, Tokyo (JP); FUJITSU LIMTED, Kawasaki-shi (JP)

(72) Inventors: Katsumi Shimada, Kawasaki (JP); Motohiro Tsuji, Musashino (JP); Takafumi Hamano, Musashino (JP); Masaaki Inami, Musashino (JP); Hiroto Takechi, Musashino (JP); Kenichi Aoyagi, Musashino (JP)

(73) Assignees: FUJITSU LIMITED, Kawasaki (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 18 days.

(21) Appl. No.: 14/304,852

(22) Filed: Jun. 13, 2014

(65) Prior Publication Data
US 2015/0103673 A1 Apr. 16, 2015

(30) Foreign Application Priority Data
Jun. 14, 2013 (JP) .................................. 2013-125659

(51) Int. Cl.
*H04L 12/28* (2006.01)
*H04J 3/00* (2006.01)
(Continued)

(52) U.S. Cl.
CPC ....... *H04L 41/0893* (2013.01); *H04L 43/0811* (2013.01); *H04L 43/0817* (2013.01); *H04L 45/128* (2013.01); *H04L 45/245* (2013.01)

(58) Field of Classification Search
CPC .. H04L 43/0811; H04L 43/50; H04L 12/2697; H04Q 11/0478
See application file for complete search history.

(56) References Cited

U.S. PATENT DOCUMENTS

| | | | |
|---|---|---|---|
| 2008/0056250 A1* | 3/2008 | Takase | H04L 45/021 370/389 |
| 2009/0010254 A1* | 1/2009 | Shimada | H04L 45/245 370/389 |

(Continued)

FOREIGN PATENT DOCUMENTS

JP  2009-543500  12/2009

OTHER PUBLICATIONS

IEEE Std 802.1AX-2008 Link Aggregation.
(Continued)

*Primary Examiner* — Brian Roberts
*Assistant Examiner* — Abu-Sayeed Haque
(74) *Attorney, Agent, or Firm* — Staas & Halsey LLP

(57) ABSTRACT

A frame transmission apparatus includes multiple ports provided in a line unit, and a setting control unit. The setting control unit checks the normality of the frame transfer state within the apparatus by transferring a maintenance management frame from a first port to a second port within the apparatus. When the first port is a logical port configured by link aggregation of multiple physical ports, the setting control unit selects each of the multiple physical ports as a transmission source port and transfers multiple maintenance management frames from the multiple physical ports to the second port.

12 Claims, 26 Drawing Sheets

(51) Int. Cl.
*H04L 12/24* (2006.01)
*H04L 12/26* (2006.01)
*H04L 12/709* (2013.01)
*H04L 12/735* (2013.01)

(56) References Cited

U.S. PATENT DOCUMENTS

| | | | | |
|---|---|---|---|---|
| 2009/0201819 A1* | 8/2009 | Mizutani | ............... | H04L 12/185 370/241.1 |
| 2010/0124174 A1* | 5/2010 | Shimada | ............. | H04L 43/0811 370/249 |
| 2010/0208580 A1* | 8/2010 | Kikuta | ................ | H04L 41/0677 370/216 |
| 2010/0226377 A1* | 9/2010 | Ogasahara | .............. | H04L 45/00 370/400 |
| 2010/0238813 A1* | 9/2010 | Allan | .................... | H04L 12/437 370/252 |
| 2012/0147742 A1* | 6/2012 | Kitamori | ............. | H04L 12/2697 370/225 |
| 2013/0016617 A1* | 1/2013 | Nishikawa | .......... | H04L 43/0811 370/243 |
| 2013/0259465 A1* | 10/2013 | Blair | ..................... | H04B 10/27 398/2 |
| 2014/0301404 A1* | 10/2014 | Zheng | ...................... | H04L 1/22 370/419 |
| 2015/0003290 A1* | 1/2015 | Kusumoto | ............. | H04L 45/16 370/254 |

OTHER PUBLICATIONS

ITU-T Y.1731, "OAM functions and mechanisms for Ethernet based networks" ("Ethernet" is a registered trademark).
Std 802.1ag Virtual Bridged Local Area Networks Amendment 5: Connectivity Fault Management.
ITU-T G.8113.1Y.1372.1 Operations, administration and maintenance mechanism for MPLS-TP in packet transport network.
Requirements of an MPLS Transport Profile.

* cited by examiner

↑THE HEAD OF FRAME

Opcode 0x03 INDICATES LOOPBACK MESSAGE (LBM)
AND 0x02 INDICATES LOOPBACK REPLY (LBR).

FIG.8

| PHYSICAL PORT | VLAN-ID | DESTINATION SLOT NUMBER | DESTINATION PORT NUMBER | TRANSMISSION VLAN-ID |
|---|---|---|---|---|
| ⋮ | ⋮ | ⋮ | ⋮ | ⋮ |
| 1 | 10 | 2 | 3 | 100 |
| ⋮ | ⋮ | ⋮ | ⋮ | ⋮ |
| 8 | 20 | TRUNK 1 | | 30 |
| ⋮ | ⋮ | ⋮ | ⋮ | ⋮ |

FIG.12

| TRUNK ID | SLOT NUMBER | PHYSICAL PORT NUMBER |
|---|---|---|
| 1 | 1 | 1 |
| 1 | 2 | 1 |
| 2 | 1 | 4 |
| 2 | 2 | 4 |
| 2 | 3 | 4 |
| ⋮ | ⋮ | ⋮ |

FIG.13

| TRANSMISSION DESTINATION SLOT NUMBER | TRANSMISSION DESTINATION PHYSICAL PORT NUMBER | VLAN-ID FOR THE TRANSMISSION | TRANSMISSION SOURCE SLOT NUMBER | TRANSMISSION SOURCE PHYSICAL PORT NUMBER |
|---|---|---|---|---|

FIG.14

| PHYSICAL PORT | TRANSMISSION VLAN-ID | MEP SETTING | MEP LEVEL |
|---|---|---|---|
| ⋮ | ⋮ | ⋮ | ⋮ |
| 2 | 501 | SET | 2 |
| 3 | 501 | SET | 2 |
| 4 | 501 | SET | 2 |
| 5 | 21 | NONE | 5 |
| ⋮ | ⋮ | ⋮ | ⋮ |

FIG.15

| PHYSICAL PORT | TRANSMISSION VLAN-ID | MIP SETTING | MIP LEVEL |
|---|---|---|---|
| ⋮ | ⋮ | ⋮ | ⋮ |
| 2 | 501 | NONE | 2 |
| 3 | 501 | NONE | 2 |
| 4 | 501 | NONE | 2 |
| 5 | 21 | SET | 5 |
| ⋮ | ⋮ | ⋮ | ⋮ |

FIG.18A

CONNECTION SETTING TABLE IN THE LINE UNIT OF SLOT 1

| PHYSICAL PORT | VLAN-ID | DESTINATION SLOT NUMBER | DESTINATION PORT NUMBER | TRANSMISSION VLAN-ID |
|---|---|---|---|---|
| ⋮ | ⋮ | ⋮ | ⋮ | ⋮ |
| 1 | 100 | TRUNK 2 | | 200 |
| ⋮ | ⋮ | ⋮ | ⋮ | ⋮ |
| 4 | 200 | TRUNK 1 | | 100 |
| ⋮ | ⋮ | ⋮ | ⋮ | ⋮ |

FIG.18B

CONNECTION SETTING TABLE IN THE LINE UNIT OF SLOT 2

| PHYSICAL PORT | VLAN-ID | DESTINATION SLOT NUMBER | DESTINATION PORT NUMBER | TRANSMISSION VLAN-ID |
|---|---|---|---|---|
| ⋮ | ⋮ | ⋮ | ⋮ | ⋮ |
| 1 | 100 | TRUNK 2 | | 200 |
| ⋮ | ⋮ | ⋮ | ⋮ | ⋮ |
| 4 | 200 | TRUNK 1 | | 100 |
| ⋮ | ⋮ | ⋮ | ⋮ | ⋮ |

FIG.18C

CONNECTION SETTING TABLE IN THE LINE UNIT OF SLOT 3

| PHYSICAL PORT | VLAN-ID | DESTINATION SLOT NUMBER | DESTINATION PORT NUMBER | TRANSMISSION VLAN-ID |
|---|---|---|---|---|
| ⋮ | ⋮ | ⋮ | ⋮ | ⋮ |
| 4 | 200 | TRUNK 1 | | 100 |
| ⋮ | ⋮ | ⋮ | ⋮ | ⋮ |

FIG.19

| NUMBER | TRANSMISSION SOURCE | TRANSMISSION DESTINATION | REPLY RECEPTION STATE |
|---|---|---|---|
| 1 | S1P1 | S1P4 | NO REPLY |
| 2 | S1P1 | S2P4 | NO REPLY |
| 3 | S1P1 | S3P4 | NO REPLY |
| 4 | S2P1 | S1P4 | NO REPLY |
| 5 | S2P1 | S2P4 | NO REPLY |
| 6 | S2P1 | S3P4 | NO REPLY |

FIG.20

| NUMBER | TRANSMISSION SOURCE | TRANSMISSION DESTINATION | REPLY RECEPTION STATE |
|---|---|---|---|
| 1 | S1P1 | S1P4 | REPLY RECEIVED |
| 2 | S1P1 | S2P4 | REPLY RECEIVED |
| 3 | S1P1 | S3P4 | NO REPLY |
| 4 | S2P1 | S1P4 | REPLY RECEIVED |
| 5 | S2P1 | S2P4 | NO REPLY |
| 6 | S2P1 | S3P4 | REPLY RECEIVED |

FRAME TRANSMISSION APPARATUS AND METHOD FOR CHECKING NORMALITY

CROSS-REFERENCE TO RELATED APPLICATIONS

This application claims priority to Japanese Patent Application No. 2013-125659 filed on Jun. 14, 2013, the disclosure of which is hereby incorporated by reference in its entirety.

BACKGROUND OF THE INVENTION

1. Field of the Invention

The present invention relates to a frame transmission apparatus and a method for checking normality in a frame transmission apparatus.

2. Description of the Related Art

As a technique for improving the quality of a communication path between communication apparatuses performing packet transfer, a link aggregation technique as described in Non-Patent Document 1 is known. Link aggregation is a technique of providing multiple physical links, such as cables, between neighboring communication apparatuses and bundling the physical links to form a virtual logical link. With the link aggregation, a communication path with a wider band can be obtained without preparing an expensive cable or communication interface. Also, since multiple physical links are used in parallel, even when part of the physical links has broken, complete disconnection of the communication path can be prevented, thereby improving availability of communication systems. In a communication system adopting link aggregation, a packet is transferred using one of multiple physical links.

Also, as a technique for maintaining networks for telecommunications carriers providing Layer 2 virtual private network (VPN) services, a function called Ethernet operations, administration, and maintenance (OAM) is known (Ethernet is a registered trademark). Ethernet OAM is standardized in Non-Patent Documents 2 and 3. In Ethernet OAM, a maintenance function point called a maintenance entity group end point (MEP) can be set. For example, a frame for maintenance management (hereinafter, referred to as a "maintenance management frame") defined in Ethernet OAM is transmitted between two MEPs so as to check the normality of the frame transmission state between the MEPs.

[Non-Patent Document 1] IEEE Std 802.1AX -2008 Link Aggregation

[Non-Patent Document 2] ITU-T Y.1731, "OAM functions and mechanisms for Ethernet based networks" ("Ethernet" is a registered trademark)

[Non-Patent Document 3] IEEE Std 802.1ag Virtual Bridged Local Area Networks Amendment 5: Connectivity Fault Management

SUMMARY OF THE INVENTION

A MEP can be set in a port to which link aggregation is applied. However, as defined in Non-Patent Document 2, a MEP operates at the layer for bridges, which is upper than the layer for link aggregation. Therefore, when a MEP is set while link aggregation is configured, information on a logical port bundling multiple physical ports is used as port information, instead of information on individual physical ports.

Accordingly, when the frame transmission state within a communication apparatus, in which multiple physical ports are bundled into a logical port, is checked using a maintenance management frame, only one specific physical port is sometimes checked among the multiple physical ports. In other words, only part of multiple frame transfer paths within the apparatus is sometimes checked for normality. Therefore, the inventors have thought that an improvement is required to thoroughly check the normality of multiple frame transfer paths within an apparatus.

The present invention has been made on the basis of the aforementioned problem recognized by the inventors, and a major purpose thereof is to provide a technique for supporting thorough checking of normality of multiple frame transfer paths within a communication apparatus in which multiple physical ports are bundled into a logical port.

To solve the problems above, a frame transmission apparatus of an embodiment of the present invention comprises: a plurality of ports; and a monitoring unit configured to check the normality of the frame transfer state within the apparatus by transferring a predetermined maintenance management frame from a first port to a second port within the apparatus. When the first port is a logical port configured by logically bundling a plurality of physical ports by link aggregation, the monitoring unit selects each of the plurality of physical ports as a transmission source port and transfers a plurality of maintenance management frames from the plurality of physical ports to the second port.

Another embodiment of the present invention is also a frame transmission apparatus. The apparatus comprises: a plurality of ports; and a monitoring unit configured to check the normality of the frame transfer state within the apparatus by transferring a predetermined maintenance management frame from a first port to a second port within the apparatus. When the second port is a logical port configured by logically bundling a plurality of physical ports by link aggregation, the monitoring unit selects each of the plurality of physical ports as a transmission destination port and transfers a plurality of maintenance management frames from the first port to the plurality of physical ports.

Yet another embodiment of the present invention is also a frame transmission apparatus. The apparatus comprises: a plurality of ports; and a monitoring unit configured to check the normality of the frame transfer state within the apparatus by transferring a predetermined maintenance management frame from a first port to a second port within the apparatus. When each of the first port and the second port is a logical port configured by logically bundling a plurality of physical ports by link aggregation, the monitoring unit selects each of a plurality of physical ports belonging to the first port as a transmission source port, selects each of a plurality of physical ports belonging to the second port as a transmission destination port, and transfers a plurality of maintenance management frames so as to cover all the combinations of a transmission source physical port and a transmission destination physical port.

Still yet another embodiment of the present invention is also a frame transmission apparatus. The apparatus comprises: a plurality of ports; and a monitoring unit configured to check the normality of the frame transfer state within the apparatus by transferring a predetermined maintenance management frame from a first port to a second port within the apparatus. The first port is a logical port configured by logically bundling a plurality of physical ports by link aggregation. When receiving, from a maintenance person, designation of a specific physical port among the plurality of physical ports as the transmission source port of the maintenance management frame, the monitoring unit transfers the maintenance management frame from the specific physical port to the second port.

Still yet another embodiment of the present invention is also a frame transmission apparatus. The apparatus comprises: a plurality of ports; and a monitoring unit configured to check the normality of the frame transfer state within the apparatus by transferring a predetermined maintenance management frame from a first port to a second port within the apparatus. The second port is a logical port configured by logically bundling a plurality of physical ports by link aggregation. When receiving, from a maintenance person, designation of a specific physical port among the plurality of physical ports as the transmission destination port of the maintenance management frame, the monitoring unit transfers the maintenance management frame from the first port to the specific physical port.

Still yet another embodiment of the present invention is also a frame transmission apparatus. The apparatus comprises: a plurality of ports; and a monitoring unit configured to check the normality of the frame transfer state within the apparatus by transferring a predetermined maintenance management frame from a first port to a second port within the apparatus. Each of the first port and the second port is a logical port configured by logically bundling a plurality of physical ports by link aggregation. When receiving, from a maintenance person, designation of a specific physical port in one of the first port and the second port as the transmission source port or the transmission destination port of the maintenance management frame, the monitoring unit transfers a plurality of maintenance management frames so as to cover all the combinations of the specific physical port designated by the maintenance person and one of a plurality of physical ports belonging to the other logical port for which no designation is provided.

Still yet another embodiment of the present invention is also a frame transmission apparatus. The apparatus comprises: a plurality of ports; and a monitoring unit configured to check the normality of the frame transfer state within the apparatus by transferring a predetermined maintenance management frame from a first port to a second port within the apparatus. Each of the first port and the second port is a logical port configured by logically bundling a plurality of physical ports by link aggregation. When receiving, from a maintenance person, designation of a specific physical port among a plurality of physical ports belonging to the first port as the transmission source port of the maintenance management frame and designation of a specific physical port among a plurality of physical ports belonging to the second port as the transmission destination port of the maintenance management frame, the monitoring unit transfers the maintenance management frame from the transmission source physical port to the transmission destination physical port as designated by the maintenance person.

A further embodiment of the present invention is a method for checking normality. In the method, a frame transmission apparatus provided with a plurality of ports performs checking the normality of the frame transfer state within the apparatus by transferring a predetermined maintenance management frame from a first port to a second port within the apparatus. When each of the first port and the second port is a logical port configured by logically bundling a plurality of physical ports by link aggregation, the checking includes selecting each of a plurality of physical ports belonging to the first port as a transmission source port, and selecting each of a plurality of physical ports belonging to the second port as a transmission destination port, and transferring a plurality of maintenance management frames so as to cover all the combinations of a transmission source physical port and a transmission destination physical port.

Optional combinations of the aforementioned constituting elements, and implementations of the invention in the form of methods, systems, programs, and recording media storing programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 8 shows a connection setting table;

FIG. 12 shows a link aggregation composition table;

FIG. 13 is a diagram that shows an example of an in-apparatus header;

FIG. 14 shows a MEP setting table;

FIG. 15 shows a MIP setting table;

FIG. 18A shows connection setting tables in the switch 2 shown in FIG. 17;

FIG. 18B also shows connection setting tables in the switch 2 shown in FIG. 17;

FIG. 18C also shows connection setting tables in the switch 2 shown in FIG. 17;

FIG. 19 shows an LBM transmission table;

FIG. 20 also shows an LBM transmission table;

DETAILED DESCRIPTION OF THE INVENTION

Figure 1:
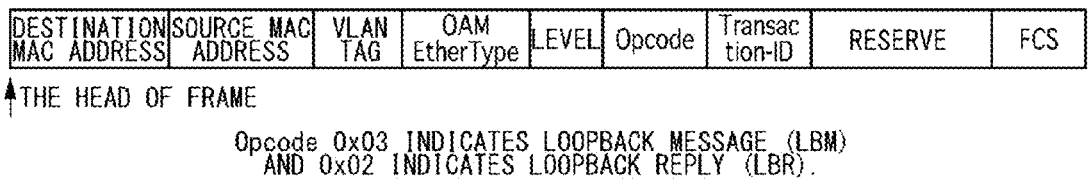
FIG. 1 is a diagram that shows a format of a frame used in the loopback function in Ethernet OAM.

The invention will now be described by reference to the preferred embodiments. This does not intend to limit the scope of the present invention, but to exemplify the invention.

A general description will be given before the configuration of a frame transmission apparatus according to an embodiment is described.

According to the aforementioned Non-patent Document 1 (Chap. 5.2.1 Principles of Link Aggregation f), it is required in link aggregation that the transmission order of packets in communication between a pair of a source address and a destination address (hereinafter, also referred to as a "conversation") does not change within a transmission path therebetween. Packets that belong to the same conversation need be transmitted using the same physical link. Meanwhile, a method is known in which, when packets are distributed to multiple physical links, hash calculation is performed on header information in a packet so that load distribution is performed without being biased toward a specific link (Annex A.2 Port selection in Non-patent Document 1, for example). The header information includes, for example, a source MAC address, a destination MAC address, and a VLAN-ID at Layer 2, and a source IP address and a destination IP address at Layer 3.

Also, as described in the aforementioned Non-patent Document 2, the Ethernet OAM function includes three fault management functions of the continuity check (CC), loopback (LB), and link trace (LT). In addition, various functions for diagnosing network quality are also described in Non-patent Document 3, such as frame loss measurement, frame delay measurement, and throughput tests.

In the Ethernet OAM function, a MEP can be set as a maintenance function point for a combination of "a port and a VLAN". When a MEP is set, a maintenance management frame (also called an "OAM frame") that belongs to the port and VLAN is terminated thereat and is not transferred downstream beyond the MEP. A MEP is set for each direction of frame transmission, and they are called a "Down MEP" and an "Up MEP". A Down MEP is a MEP that terminates a maintenance management frame input from the outside of the apparatus, at the port that has received the frame. Also, a maintenance management frame towards the outside of the apparatus is transmitted from the port of the Down MEP.

An Up MEP is set for a port and a VLAN, which identify the output mode of a frame after the frame is switched within an apparatus and the output port therefor is determined. For example, in a chassis-based switch, an Up MEP is a MEP that terminates a maintenance management frame input from the backboard side to the line unit. Also, a maintenance management frame towards the backboard is transmitted from the port of the Up MEP. When a maintenance management frame is input from a direction opposite to the direction of a MEP, the frame is discarded.

A range managed by means of a maintenance management frame in a network is a section delimited by MEPs at the both ends. Multiple MEPs can be set for the same "port and VLAN" so that MEPs used to manage a wide range and MEPs used to manage a narrow range can be separately set, and levels can also be set for the MEPs to distinguish them. The level is set to a value between 0 and 7, in which a smaller value is used to manage a narrower range. Meanwhile, the protocol data unit (PDU) of a maintenance management frame also includes a level value, and an apparatus that receives maintenance management frames is permitted to process only a maintenance management frame having a level corresponding to that of the management section in which the apparatus is managed. When a level specified for a maintenance management frame is higher than that set for a MEP, the maintenance management frame passes through the MEP without being terminated thereat.

As partly stated, when link aggregation is configured, an Up MEP can also be set for a logical port bundling multiple physical ports. It can be said that a logical port is one end of a logical link formed by bundling multiple physical links using a link aggregation technique. In other words, it can be said that a logical port is a single port obtained by logically aggregating multiple physical ports, each of which is one end of a physical link among multiple physical links bundled by means of a link aggregation technique.

A MEP operates at the layer for bridges (typically at Layer 2), which is upper than the layer for link aggregation. Therefore, when a MEP is set while link aggregation is configured, information on a logical port is used as port information, instead of information on a physical port. Namely, in this case, a MEP is set for a logical port configured by link aggregation. Hereinafter, a logical port configured by link aggregation will be called a "trunk", and a number for identifying an individual trunk will be called a "trunk ID".

FIG. 1 shows a format of a frame used in the loopback function of Ethernet OAM functions. In the loopback, two kinds of frames, a loopback message (hereinafter, also referred to as an "LBM" and may also be called a "loopback request frame") and a loopback reply (hereinafter, also referred to as an "LBR"), are used. Both an LBM and an LBR have the format shown in FIG. 1. An LBM or an LBR is identified by EtherType, next to a VLAN tag, and Opcode (operation code). When there is no VLAN tag, it is identified by EtherType positioned immediately after a MAC address, and Opcode.

The loopback is a generally-known function to check the communicability within a section arbitrarily specified on a network. More specifically, an LBM including loopback information is transmitted from a maintenance function point provided as one end of a section of which communicability is to be checked, and an LBR is returned from another maintenance function point at the other end, which is designated as a return point, and received by the transmission source, so that the communicability within the specified section can be checked.

In a port positioned within a section delimited by two MEPs, a maintenance function point called a maintenance intermediate point (MIP) may also be set. As with a MEP, a MIP is set for a combination of a port and a VLAN and assigned a level. Multiple MIPs may be arranged within a section delimited by MEPs, and each MIP is identified using, for example, the MAC address of the port. When an LBM is received at a MIP, the loopback is returned at the MIP if the level of the LBM coincides with the level of the MIP and the destination MAC address designated by the LBM coincides with the MAC address of the MIP. Namely, the MIP terminates the received LBM and transmits an LBR as a reply to the LBM.

Figure 2:
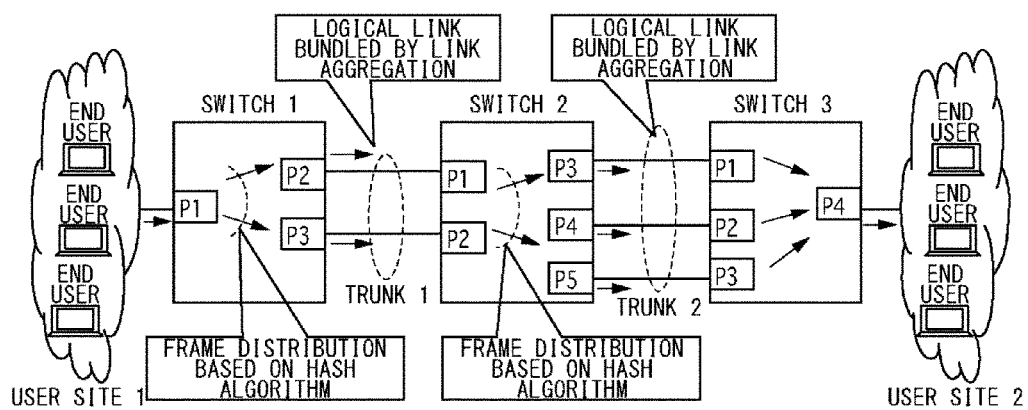
FIG. 2 is a schematic diagram of a network for a Layer 2 data communication service.

FIG. 2 is a schematic diagram of a network for a Layer 2 data communication service. This diagram shows an example in which a link aggregation technique is applied to relay sections for frames. In this network, a data communication service is provided between a user site 1 and a user site 2, using three frame transmission apparatuses of a switch 1 (SW1), a switch 2 (SW2), and a switch 3 (SW3).

In FIG. 2, Pn (n is a number) denotes an Ethernet port for connecting a cable to a physical link.

In FIG. 2, a connection is created within the switch 1 so that a frame received on a port 1 (P1) is transferred to a trunk 1. Similarly, within the switch 2 is created a connection such that a frame received in the trunk 1 is transferred to a trunk 2, and within the switch 3 is created a connection such that a frame received in the trunk 2 is transferred to a port 4 (P4). Also, between the switch 1 and switch 2, two physical links are aggregated into a logical link of the trunk 1, and hence, the switches are connected by the trunk 1. Similarly, between the switch 2 and switch 3, three physical links are aggregated into the trunk 2, and hence, the switches are connected by the trunk 2.

When an apparatus of an end user in the user site 1 transmits a frame, the switch 1 receives the frame at P1. Upon identifying the transfer destination of the frame as the trunk 1 according to the reception position, the switch 1 refers to the content of the frame and selects one physical link in the trunk 1 as the transfer destination based on a predetermined hash algorithm. Consequently, the frame is output from P2 of the switch 1, transmitted through a physical link to which P2 belongs, and received on P1 of the switch 2, for example.

In the same way, the switch 2 refers to the content of the received frame, selects one physical link in the trunk 2, e.g., a link for P4 of the switch 2, based on a predetermined hash algorithm, and outputs the frame via P4. When the frame is transmitted through a physical link to which P4 of the switch 2 belongs and received on P2 of the switch 3, the switch 3 transfers the frame received in the trunk 2 to P4, so that the frame is provided to the user site 2 via P4 of the switch 3.

In this way, in a section to which link aggregation is applied, a single physical link is selected for each frame based on a hash algorithm. Accordingly, when a MAC address in each frame transmitted from a user site is changed, for example, a physical link to be selected is also changed; as a result, all physical links are used with load balancing performed, instead of a specific physical link being intensively used. Also when a frame is transferred from the user site 2 toward the user site 1, each physical link is used with load balancing performed based on a hash algorithm, as stated above.

Figure 3:
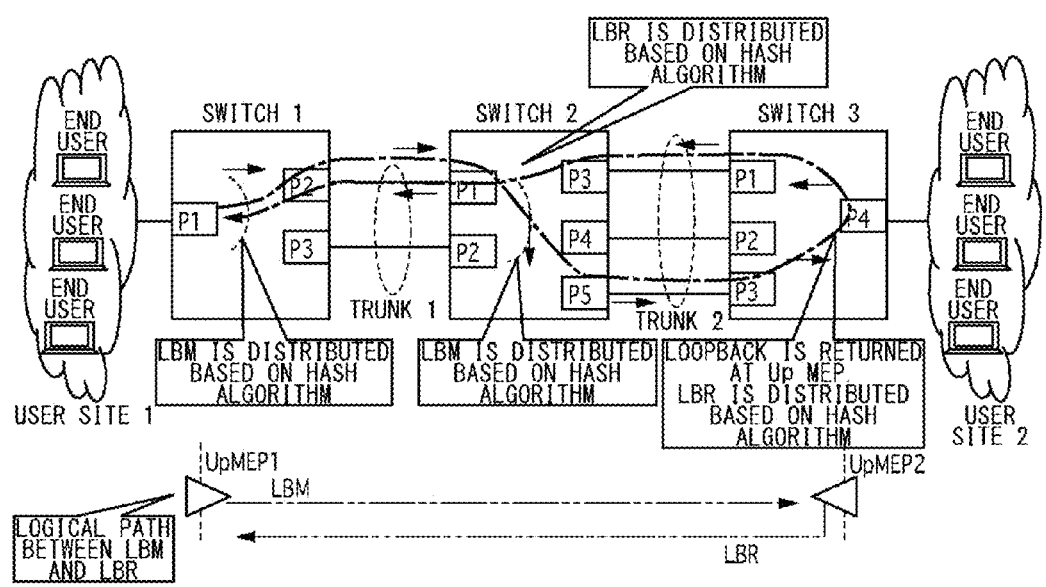
FIG. 3 is a diagram that shows an exemplary operation in a loopback test of Ethernet OAM.

FIG. 3 shows an exemplary operation in a loopback test of Ethernet OAM. This diagram shows the case where the normality of end-to-end frame transmission in a data transmission service is checked by a loopback test of Ethernet OAM, in the network shown in FIG. 2. In the lower part of FIG. 3, Up MEPs are denoted by triangles, and the movement of an LBM and an LBR logically transferred in a section delimited by the two Up MEPs is denoted by long dashed double-dotted lines. In the upper part of FIG. 3, paths for physical transfer of an LBM and an LBR are denoted by long dashed dotted lines.

As with user frames, which are frames transmitted between user sites (i.e., main signals), LBMs and LBRs are also distributed to paths according to a hash algorithm in a section to which link aggregation is applied, as shown in FIG. 3. Accordingly, since the MAC addresses in an LBM or an LBR do not change in a loopback test between the same two Up MEPs, an LBM or an LBR is always transmitted through the same physical link. For example, when an LBM is transferred from the switch 1 to the switch 2 via the trunk 1, only the link from P2 of the switch 1 to P1 of the switch 2 is used, as shown in FIG. 3. Therefore, in a loopback test between Up MEPs, sections (paths) through which an LBM or an LBR is not transmitted cannot be checked for normality of frame transmission.

Meanwhile, as a technique for transmitting an OAM frame to a specific link in link aggregation, a method is known in which a Down MEP that does not belong to a specific VLAN is set for a physical link at a layer lower than that for link aggregation before a loopback test is performed, as described in "Ch22.2.2 Creating MEPs" in Non-Patent Document 3. Also, in the published Japanese translation of PCT application No. 2009-543500 is described a technique by which, when an OAM function including a loopback test is performed in a section connected using link aggregation, a physical link used to transmit a frame can be specified.

Figure 4:
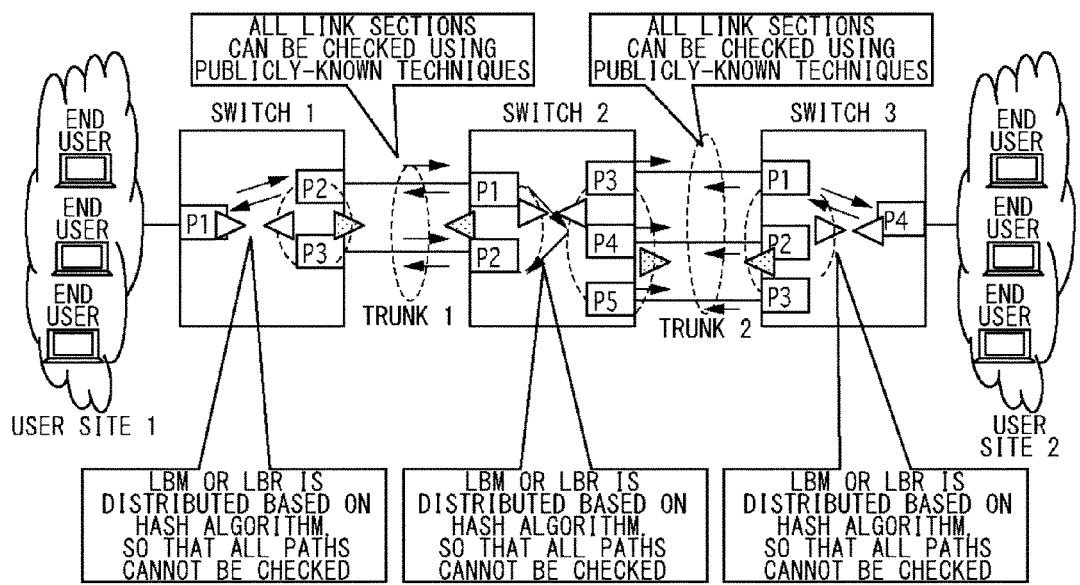
FIG. 4 is a diagram that shows another exemplary operation in a loopback test of Ethernet OAM.

FIG. 4 also shows an exemplary operation in a loopback test of Ethernet OAM. This diagram shows the case where a loopback test is performed between Down MEPs. In FIG. 4, Down MEPs are denoted by dotted triangles. According to the technique described in the published Japanese translation of PCT application No. 2009-543500, a Down MEP is set for a trunk and operates as a maintenance function point from which a loopback frame is transmitted to the outside of the apparatus. Also, according to the method described in "Ch22.2.2 Creating MEPs" in Non-Patent Document 3, a Down MEP that does not belong to a specific VLAN is set for a physical port. According to these techniques, also when the apparatus is connected to a neighboring apparatus using link aggregation, each physical link can be checked for normality by performing a loopback test between Down MEPs in which the physical link is specified.

On the other hand, in order to check the normality of the frame transmission state in a network, checking physical links between the apparatuses does not suffice. More specifically, a frame transfer path within an apparatus, i.e., a section within an apparatus between a port that receives a frame from the outside of the apparatus and a processing unit that outputs the frame to the outside of the apparatus, based on a connection, also need be checked for the normality of the frame transfer state.

Such a feature of checking a frame transfer path within an apparatus is not described in the aforementioned Non-Patent Document 3 or in the published Japanese translation of PCT application No. 2009-543500. The Non-Patent Document 3 describes the technique of setting an Up MEP, denoted by a white triangle in the network shown in FIG. 4, for a combination among trunks and VLANs and performing a loopback test between Up MEPs facing each other within an apparatus. However, in such a loopback test, each of LBMs and LBRs is distributed to any one of physical ports. Accordingly, multiple frame transmission paths corresponding to all the combinations with physical ports to which link aggregation is applied cannot be checked for normality.

As an example for solving such a problem, it can be considered to change the content of a frame so that an LBM or an LBR is transmitted through each of multiple sections within an apparatus in a loopback test. For example, a method can be considered in which a maintenance person sets a specific value (such as a specific MAC address) in a loopback frame so that hash operation delivers a specific result before performing a test. In this method, however, the maintenance person needs to understand the hash algorithm for distributing frames to paths within the apparatus and individually set data of multiple loopback frames accordingly. Therefore, the burden on the maintenance person is increased, and a longer time is required for the check.

Using the switch 2 shown in FIG. 2 as an example, here is considered a case where frame transfer within the apparatus is performed between a logical port to which link aggregation is applied and a logical port to which another link aggregation is applied. The number of physical ports in the trunk 1 is 2 (P1 and P2), and the number of physical ports in the trunk 2 is 3 (P3, P4, and P5); accordingly, the number of paths configured by combinations of physical ports for transferring a frame through the connection between the trunk 1 and trunk 2 will be obtained by multiplying 2 by 3, i.e., 6, in the direction from the trunk 1 to the trunk 2.

In addition, since the same physical path is not necessarily used in the reverse direction in which a loopback reply is transferred, the same tests need be performed also in the reverse direction, and repetitive checks are required to cover the physical links for all the combinations. Accordingly, it is necessary to create a loopback frame for each of 12 paths in total within the apparatus and test the paths. Also, if there are more physical ports configuring link aggregation, the amount of work will be increased, so that the burden on a maintenance person will also be increased. Further, there is a problem in that, even when only a specific combination of an input port and an output port is to be tested, the combination cannot be checked by easy operation because it is necessary to create, outside the apparatus, a test frame in which specific information (such as header information) is set and to input the test frame to the apparatus.

Therefore, the present embodiment proposes a technique by which, in an apparatus that transmits frames using link aggregation, the normality of the frame transfer state of multiple frame transfer paths within the apparatus can be checked using a method that places less burden on a maintenance person.

More specifically, a frame transmission apparatus in an embodiment comprises: means for transferring a frame including loopback request information from a maintenance function point corresponding to an input port to a maintenance function point corresponding to an output port, within an in-apparatus transfer section between a port that receives a frame from the outside of the apparatus and a port that outputs a frame, based on a connection set within the apparatus; and a processing unit that generates, when the input port is a logical port configured by link aggregation, multiple loopback messages for which different ports are specified as the transmission sources and that transmits each of the frames through one of multiple in-apparatus sections provided for all the physical ports in the link aggregation.

Also, a frame transmission apparatus comprises a processing unit that includes means for storing information on a physical port from which a loopback message has been transmitted, that generates a frame including loopback reply information after a loopback message is transferred within the apparatus and received at a maintenance function point corresponding to an output port, and that transmits a loopback reply in a direction opposite to the direction of the transfer path for the loopback message, based on stored information on the transmission source port of the loopback message.

Also, a frame transmission apparatus comprises a processing unit that generates, when the output port of a connection set within the apparatus is a logical port configured by link aggregation, multiple loopback messages for which different ports are specified as the transmission destinations and that transmits each of the frames through one of multiple in-apparatus sections provided for all the physical ports in the link aggregation.

Also, a frame transmission apparatus comprises a processing unit that generates, when each of the input port and the output port of a connection set within the apparatus is a logical port configured by link aggregation, multiple loopback messages for which different ports are specified as the transmission sources and different ports are also specified as the transmission destinations and that transmits the multiple frames through multiple in-apparatus sections provided for all available combinations of the physical ports in the link aggregations.

Also, a frame transmission apparatus comprises a processing unit that includes means by which, when the input port is a logical port configured by link aggregation, a maintenance person designates a physical port as the transmission source of a loopback message and that generates a loopback message and transmits the frame through an in-apparatus section provided for the designated physical port in the link aggregation.

Also, a frame transmission apparatus comprises a processing unit that includes means by which, when the output port of a connection set within the apparatus is a logical port configured by link aggregation, a maintenance person designates a physical port as the transmission destination of a loopback message and that generates a loopback message and transmits the frame through an in-apparatus section provided for the designated physical port in the link aggregation.

Also, a frame transmission apparatus comprises a processing unit that includes means by which, when each of the input port and the output port of a connection set within the apparatus is a logical port configured by link aggregation, a maintenance person designates a physical port as the transmission source of a loopback message and designates another physical port as the transmission destination of the loopback message and that transmits the loopback message through an in-apparatus section provided for the designated physical ports in the link aggregations.

Also, a frame transmission apparatus in an embodiment comprises a processing unit that generates a loopback message at a MEP as a maintenance function point and that receives a loopback message and transmits a loopback reply also at a MEP as a maintenance function point. Also, a frame transmission apparatus comprises a processing unit that generates a loopback message at a MEP as a maintenance function point and that transmits a loopback reply from a MIP as a maintenance function point.

With a frame transmission apparatus proposed in the embodiments, whether or not the frame transmission state is normal can be checked automatically and thoroughly by using maintenance management frames, with regard to multiple in-apparatus sections provided for all the physical ports constituting link aggregation. Accordingly, the normality of multiple frame transmission paths within the frame transmission apparatus for which link aggregation is configured can be thoroughly checked with easy operation by a maintenance person in a short time.

Also, by transferring a loopback reply to the transmission source in return in a direction opposite to the direction of a loopback message, the normality of the frame transmission state in both directions can be efficiently checked with regard to multiple in-apparatus sections provided for all the physical ports constituting link aggregation. Further, a maintenance person can directly designate a specific physical port for a specific in-apparatus section to be tested, from among multiple physical ports constituting link aggregation, so that whether or not the frame transfer state in the specific in-apparatus section is normal can be checked with easy operation by a maintenance person in a short time.

(First Embodiment)

A frame transmission apparatus according to the first embodiment will be detailed. In the following, the frame transmission apparatus is a switch device (such as a Layer 2 switch and a multilayer switch) that transfers an Ethernet frame via a VLAN and has a chassis structure.

Unlike a box structure, a chassis structure has the advantage that, in case part of the units fails, only the faulty part can be replaced without halting the overall operation of the apparatus. However, since the number of parts required to connect units is generally larger than that in a box structure, the importance of checking normality of in-apparatus paths is higher in a chassis structure. As a matter of course, the technique of the frame transmission apparatus proposed in the embodiment is not limited to apparatuses of chassis structure and is also applicable to apparatuses of box structure and other general frame transmission apparatuses provided with multiple functional blocks for transmitting and receiving frames, i.e., multiple ports.

Figure 5:
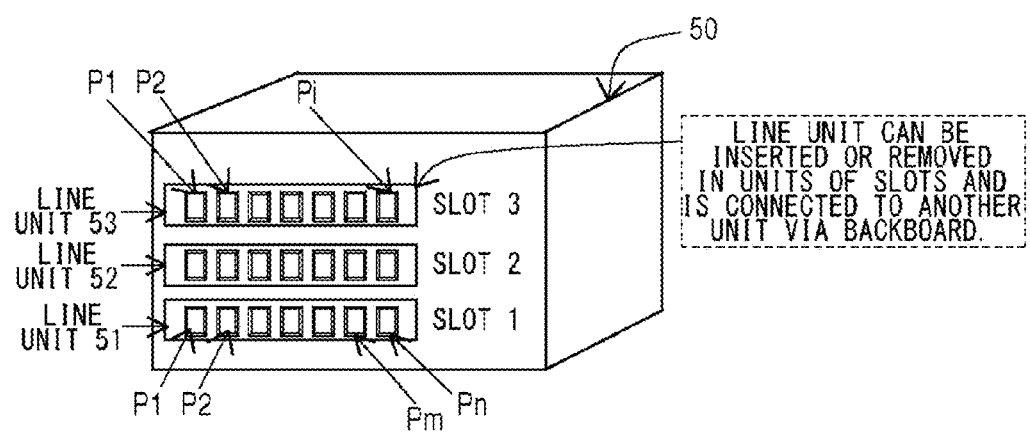
FIG. 5 is a perspective view that shows an outline view of a frame transmission apparatus according to an embodiment.

FIG. 5 is a perspective view that shows an outline view of a frame transmission apparatus according to the embodiment. Each of a line unit 51, a line unit 52, and a line unit 53 has multiple interface ports (hereinafter, referred to as "physical ports"). To each of the ports (P1-Pn) of each line unit, a terminal apparatus of an end user or another frame transmission apparatus may be connected. The positions where the line units are provided are identified by slot numbers 1-3.

Figure 6:
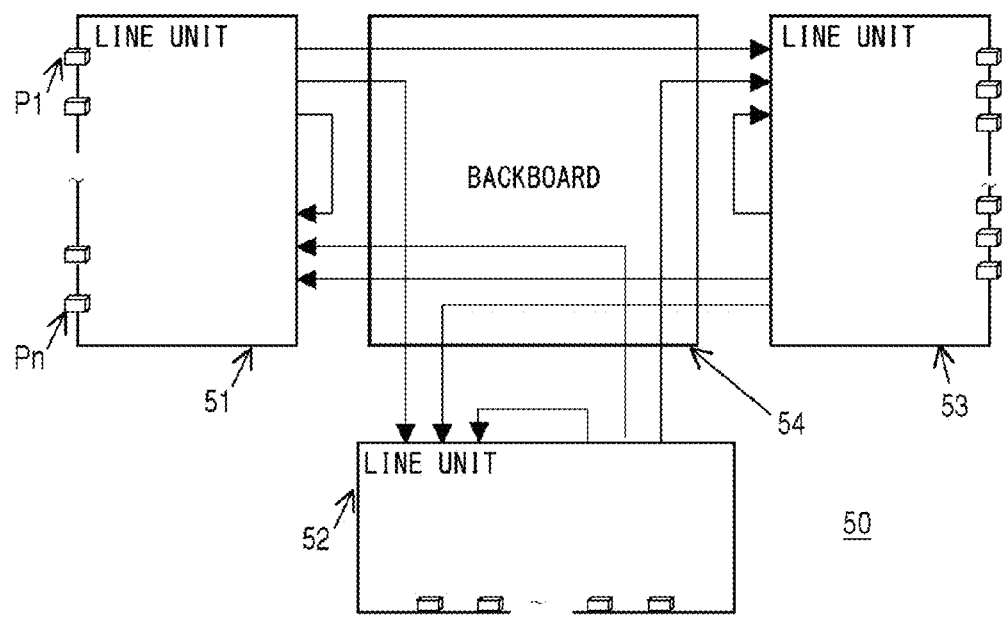
FIG. 6 is a diagram that schematically shows a hardware configuration of a frame transmission apparatus.
Figure 7:
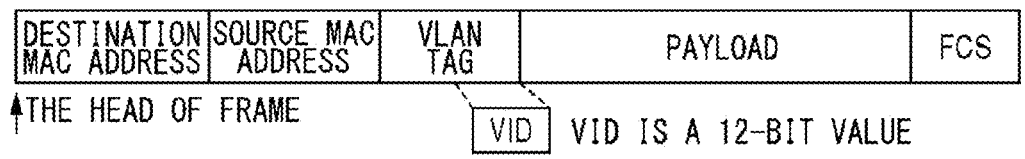
FIG. 7 is a diagram that shows a format of a frame transmitted between a frame transmission apparatus and an external device.

FIG. 6 schematically shows a hardware configuration of the frame transmission apparatus. This diagram shows a configuration in which a frame transmission apparatus 50 has three line units. Each of the line units 51-53 provides outputs to three paths and receives inputs from three paths between the line unit and a backboard 54. Each of the interface ports (P1-Pn) of each line unit is assigned one or more VLANs. When multiple VLANs are assigned to one port, a VLAN to which a frame belongs is identified by a VLAN-ID in a VLAN tag provided in the frame. FIG. 7 shows a format of a frame transmitted between the frame transmission apparatus 50 and an external device. This frame is called an "Ethernet frame" or a "MAC frame". A VLAN-ID (given as VID in FIG. 7) is a 12-bit value in a VLAN tag and a value within the range of 1 to 4094 is set therefor.

When link aggregation is configured between the frame transmission apparatus 50 and a neighboring frame transmission apparatus, and a logical port bundling multiple physical ports is provided in the frame transmission apparatus 50, a VLAN is assigned to each logical port instead of each physical port. Such a logical port is referred to as a trunk in the embodiments. Each trunk is assigned a trunk ID, which is unique within the apparatus, so as to be identified thereby. Hereinbelow, when simply referred to as a "port", it will mean a logical port (i.e., a trunk) configured by aggregating multiple physical ports if link aggregation is configured, and it will mean a physical port when link aggregation is not configured, unless otherwise noted.

A unit of point-to-point transfer within the frame transmission apparatus 50 is also referred to as a "connection". A connection is provided as a table in which a transfer destination port is specified for "a combination of an input port and a VLAN". A transfer destination port is provided as a slot number and a port number (port identifier) or as a trunk ID. This table is called a connection setting table.

FIG. 8 shows a connection setting table. A physical port field in FIG. 8 specifies an identifier of a port to which a frame is input, and a VLAN-ID field specifies a VLAN-ID for an input frame. Also, a destination slot number field and a destination port number field specify a slot number and a port number indicating a destination to which an input frame is to be transferred within the apparatus. As stated previously, a trunk ID may be provided instead of a slot number and a port number.

The connection setting table is stored in a table storage memory in a line unit. The table also contains a VLAN-ID to be specified when a frame is output to the outside of the apparatus after the frame is transferred within the apparatus. In the embodiment, the transfer destination of a frame is determined with reference to the connection setting table in which connections are statically set in advance; however, the transfer destination may be determined in a different way. For example, for a Layer 2 switch, a method is known in which the transfer destination of a frame is determined through a search based on MAC address learning for each VLAN, and, for a Layer 3 switch, a method is known in which the transfer destination of a frame is determined through a search in a routing table using a destination IP address; accordingly, the transfer destination of a frame may be determined using such methods.

A physical port that belongs to a trunk is not set as a transfer destination in the connection setting table. In other words, if the transfer destination is a configuration based on link aggregation (i.e., a logical port), a trunk ID is certainly specified. Also, a connection is not provided between physical ports that belong to the same trunk.

Figure 9:
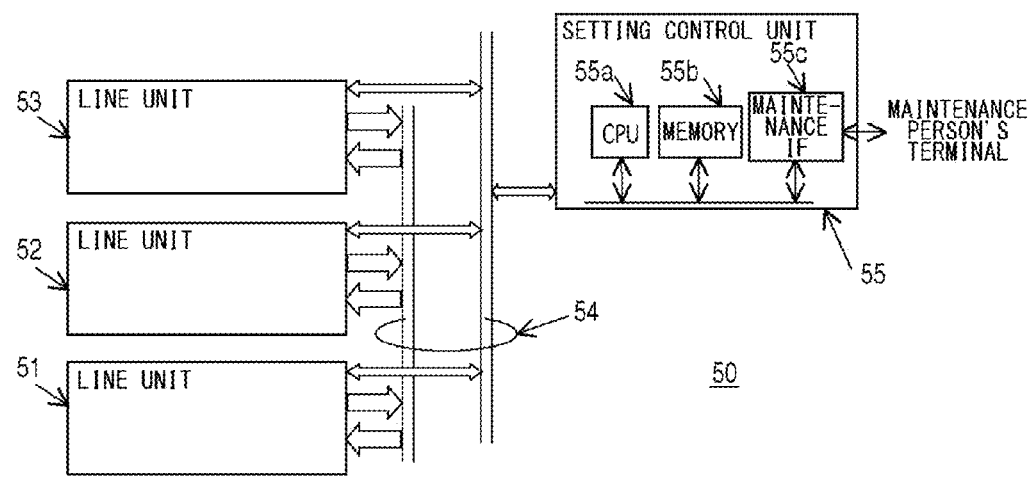
FIG. 9 is a block diagram that shows a functional configuration of the frame transmission apparatus.

FIG. 9 is a block diagram that shows a functional configuration of the frame transmission apparatus. Each block shown in a block diagram in this specification can be implemented by an element such as a CPU or memory of a computer, by a mechanism, or by an electronic circuit in terms of hardware, and by a computer program or the like in terms of software. FIG. 9 illustrates functional blocks implemented by the cooperation of those components. Therefore, it will be obvious to those skilled in the art that the functional blocks may be implemented in a variety of forms by combinations of hardware and software.

The frame transmission apparatus 50 comprises the line unit 51, line unit 52, line unit 53, backboard 54, and a setting control unit 55. A line unit is also called an interface board (interface card) and has multiple physical ports, as shown in FIG. 5. The frame transmission apparatus 50 is configured so that the line units can be increased, as needed, according to the number of links provided in the frame transmission apparatus 50 or the transfer rate of the links. The backboard 54 connects the line unit 51, line unit 52, line unit 53, and setting control unit 55 to each other.

The setting control unit 55 is also called a control panel (monitoring control panel) and provides overall control of the operation of the whole frame transmission apparatus 50. For example, the setting control unit 55 sets maintenance data for each line unit, monitors state data from each line unit, controls state transition of each line unit, and executes interface processing of a state setting signal for a maintenance person. Although the details will be described later, the setting control unit 55 also operates as a "monitoring unit" that controls each line unit and performs normality monitoring processing for an in-apparatus path using a maintenance management frame.

The setting control unit 55 comprises a CPU 55a, a memory 55b, and a maintenance IF 55c. The CPU 55a executes various data processes in the setting control unit 55. The memory 55b is a storage device that stores data to be processed by the CPU 55a and that stores various pieces of setting information. The maintenance IF 55c provides an interface function for a terminal of a maintenance person. For example, the maintenance IF 55c receives, from a maintenance person's terminal, data ordering a test, stores the data in the memory 55b, and allows the CPU 55a to execute the test process. Also, the maintenance IF 55c acquires, from the memory 55b, data indicating a test result generated by the CPU 55a and transmits the data to the maintenance person's terminal so that the test result can be viewed on the maintenance person's terminal.

Figure 10:
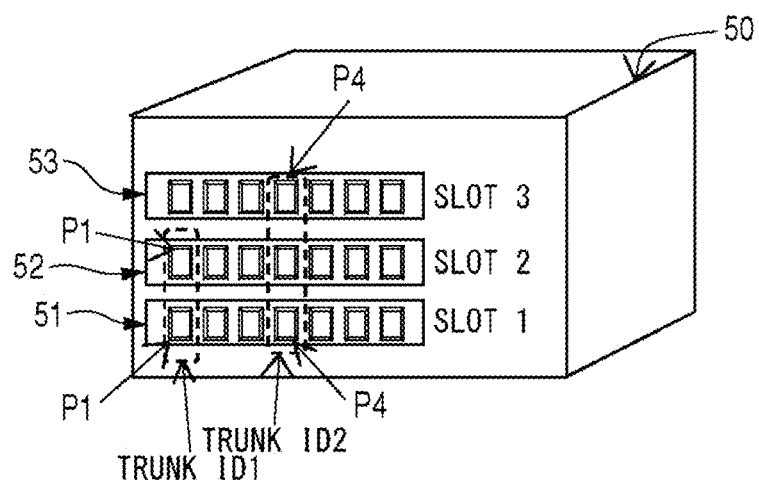
FIG. 10 is a diagram that shows an example of link aggregation in the frame transmission apparatus.

FIG. 10 shows an example of link aggregation in the frame transmission apparatus. In FIG. 10, physical ports that belong to the same trunk are surrounded by a dotted line. The trunk with the trunk ID 1 is formed by two physical ports of the port 1 in the slot 1 and the port 1 in the slot 2, and the trunk with the trunk ID 2 is formed by three ports of the port 4 in the slot 1, the port 4 in the slot 2, and the port 4 in the slot 3. Each trunk ID and information on the slots and physical ports forming the trunk are stored in a table storage memory in a line unit and the setting control unit (as a link aggregation composition table 202 described later).

Figure 11:
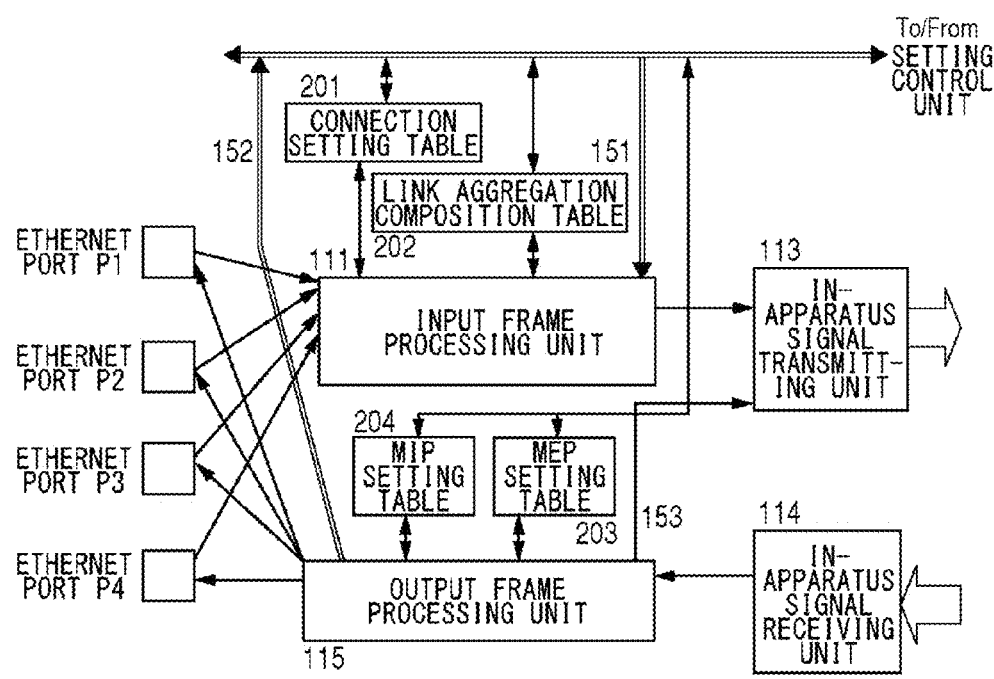
FIG. 11 is a block diagram that shows a line unit in detail.

FIG. 11 is a block diagram that shows a line unit in detail. The configuration shown in FIG. 11 is common to the line unit 51, line unit 52, and line unit 53 in the frame transmission apparatus 50. A line unit includes multiple Ethernet ports, a connection setting table 201, a link aggregation composition table 202, a MEP setting table 203, a MIP setting table 204, an input frame processing unit 111, an in-apparatus signal transmitting unit 113, an in-apparatus signal receiving unit 114, and an output frame processing unit 115. In FIG. 11, four Ethernet ports of P1, P2, P3, and P4 are provided. The setting control unit 55 manages setting information for each table in the line units 51-53 and provides setting instructions to each line unit via the backboard 54.

The input frame processing unit 111 extracts a VLAN-ID from a frame received on each of P1-P4. Based on a combination of the position of the input port and the VLAN-ID, the input frame processing unit 111 refers to the connection setting table 201 (FIG. 8). Accordingly, the input frame processing unit 111 determines the slot number and physical port number of the destination or the trunk ID of the destination used when the frame is transferred within the apparatus.

When the destination is provided as a trunk ID, the input frame processing unit 111 selects a physical port based on a hash algorithm. More specifically, the input frame processing unit 111 refers to the link aggregation composition table 202 to select a combination of a slot number and a physical port number according to the result of hash operation using header information or the like, from among multiple combinations of a slot number and a physical port number that belong to the trunk ID. FIG. 12 shows the link aggregation composition table 202. FIG. 12 is associated with the example shown in FIG. 10, and multiple combinations of a slot and a port are related to each of the trunk ID 1 and trunk ID 2. Also, each record may further include information (a hash value or the like) to be compared to the result of hash operation using header information or the like, so that a specific combination can be determined.

The input frame processing unit 111 stores the information of the slot number and physical port number of the destination in a header used for transfer within the apparatus (hereinafter, referred to as an "in-apparatus header"). The input frame processing unit 111 then transfers the frame with the in-apparatus header added thereto to an in-apparatus signal transmitting unit 113 associated with the path to the destination slot. The in-apparatus signal transmitting unit 113 may be provided in association with each slot provided in the frame transmission apparatus 50, and the in-apparatus signal transmitting unit 113 transmits a frame provided from the input frame processing unit 111 to a line unit stored in the corresponding slot via the backboard 54.

FIG. 13 shows an example of an in-apparatus header added to a frame. The input frame processing unit 111 also stores in an in-apparatus header the value of a VLAN-ID to be specified when the frame is output to the outside of the apparatus. The input frame processing unit 111 further stores in an in-apparatus header the slot number and physical port number of the transmission source as information on the transmission source of the frame. Although not shown in FIG. 13, the VLAN-ID of the transmission source may also be stored in the in-apparatus header. Such information on the transmission source of a frame may be regarded as information that indicates a position processed by the input frame processing unit 111 or information that indicates the input position of the frame.

Referring back to FIG. 11, when a maintenance management frame is transmitted from the setting control unit 55, the maintenance management frame is input to the input frame processing unit 111 in a line unit via the backboard 54. The path therefor is indicated as a path 151 in FIG. 11. In this case, the setting control unit 55 determines the slot number and physical port number of the transmission destination of the maintenance management frame and stores such information in the in-apparatus header of the maintenance management frame. When the setting control unit 55 specifies information stored in the in-apparatus header of a maintenance management frame, the maintenance management frame is transferred through an in-apparatus path for the transmission source and transmission destination specified by the setting control unit 55, irrespective of a hash algorithm. The input frame processing unit 111 then transfers the maintenance management frame received from the setting control unit 55 to an in-apparatus signal transmitting unit 113 associated with the path to the slot identified by the slot number of the transmission destination.

The in-apparatus signal transmitting unit 113 transfers a frame (a user frame or a maintenance management frame) transferred from the input frame processing unit 111 to the backboard 54. The in-apparatus signal receiving unit 114, on the other hand, transfers a frame (a user frame or a maintenance management frame) transferred from the backboard 54 to the output frame processing unit 115.

The output frame processing unit 115 receives a frame transferred from the in-apparatus signal receiving unit 114 and refers to the port number and VLAN-ID stored in the in-apparatus header of the frame so as to output the received frame to the outside of the apparatus via a corresponding port.

FIG. 14 shows a MEP setting table, and FIG. 15 shows a MIP setting table. Each of the tables contains a physical port, a VLAN-ID, whether or not a MEP or a MIP is set, and the level of the MEP or MIP, which are related to each other.

When judging a frame transferred from the in-apparatus signal receiving unit 114 to be a maintenance management frame, the output frame processing unit 115 refers to the MEP setting table 203 and the MIP setting table 204 based on the port number and VLAN-ID stored in the in-apparatus header of the frame. If a MEP or a MIP is set for the combination of the port number and VLAN-ID and if the level condition is met, the output frame processing unit 115 receives and terminates the maintenance management frame and restrains the output of the frame to the outside of the apparatus. Thereafter, the output frame processing unit 115 transfers the maintenance management frame to the setting control unit 55 (path 152 in FIG. 11) or transmits a reply to the line unit of the transmission source (path 153 in FIG. 11).

At the time, the output frame processing unit 115 stores information received from the in-apparatus signal receiving unit 114 in the in-apparatus header of the maintenance management frame. Thus, the output frame processing unit 115 also operates as a "reply unit" that performs reply processing for a maintenance management frame.

In the embodiment, a maintenance management frame transferred through a connection in the frame transmission apparatus 50 is an LBM or an LBR for a loopback test as shown in FIG. 1. Whether or not the frame is a maintenance management frame can be identified by whether the EtherType value next to the VLAN tag is a predetermined EtherType value for OAM (0x8902, for example). Also, an LBM or an LBR can be identified by the Opcode value.

In the following, distinctive configurations and operations of the frame transmission apparatus 50 according to the first embodiment will be described with reference to flowcharts.

Figure 16A:
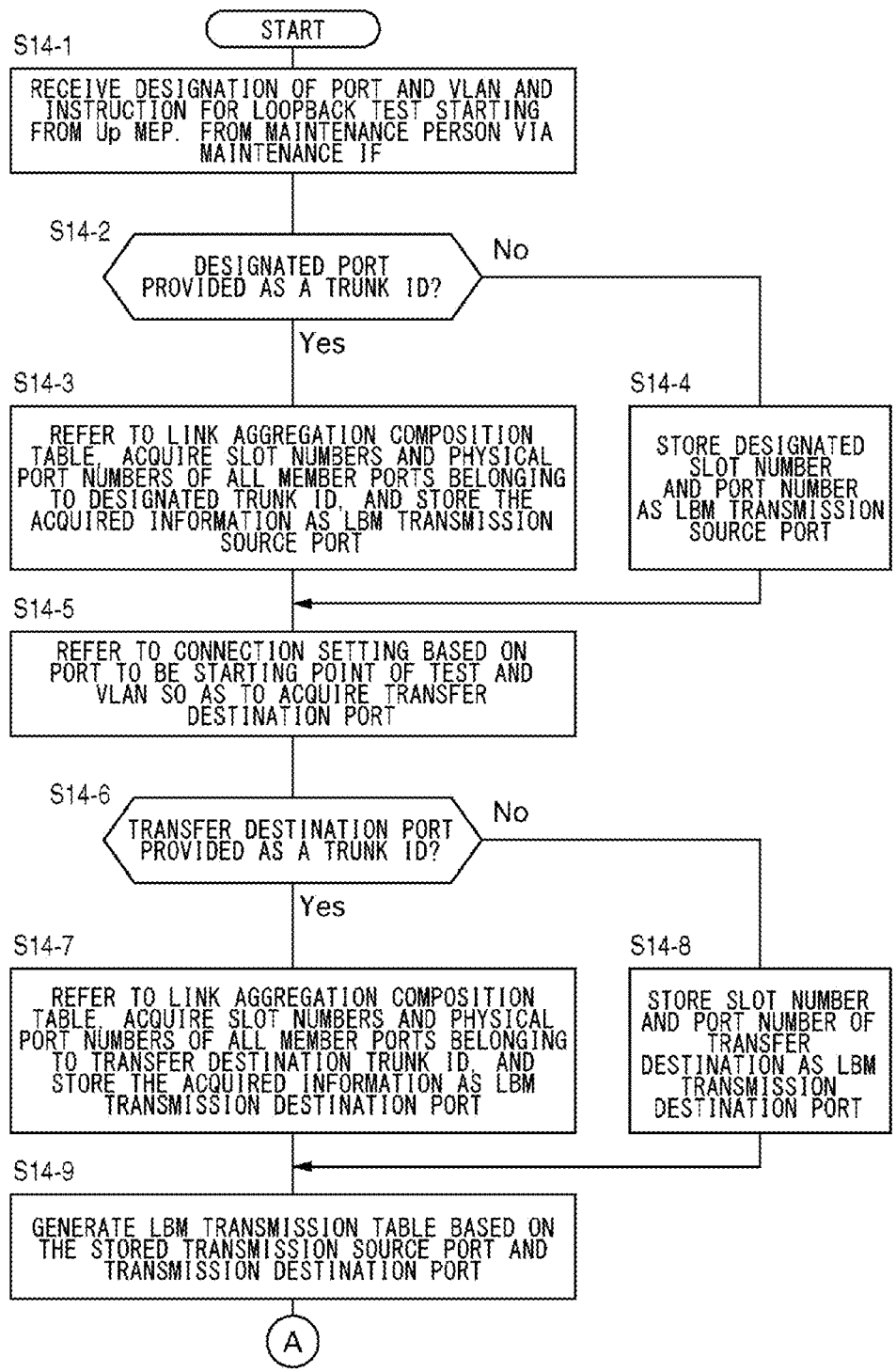
FIG. 16A is a flowchart that shows an operational process of the frame transmission apparatus.
Figure 16B:
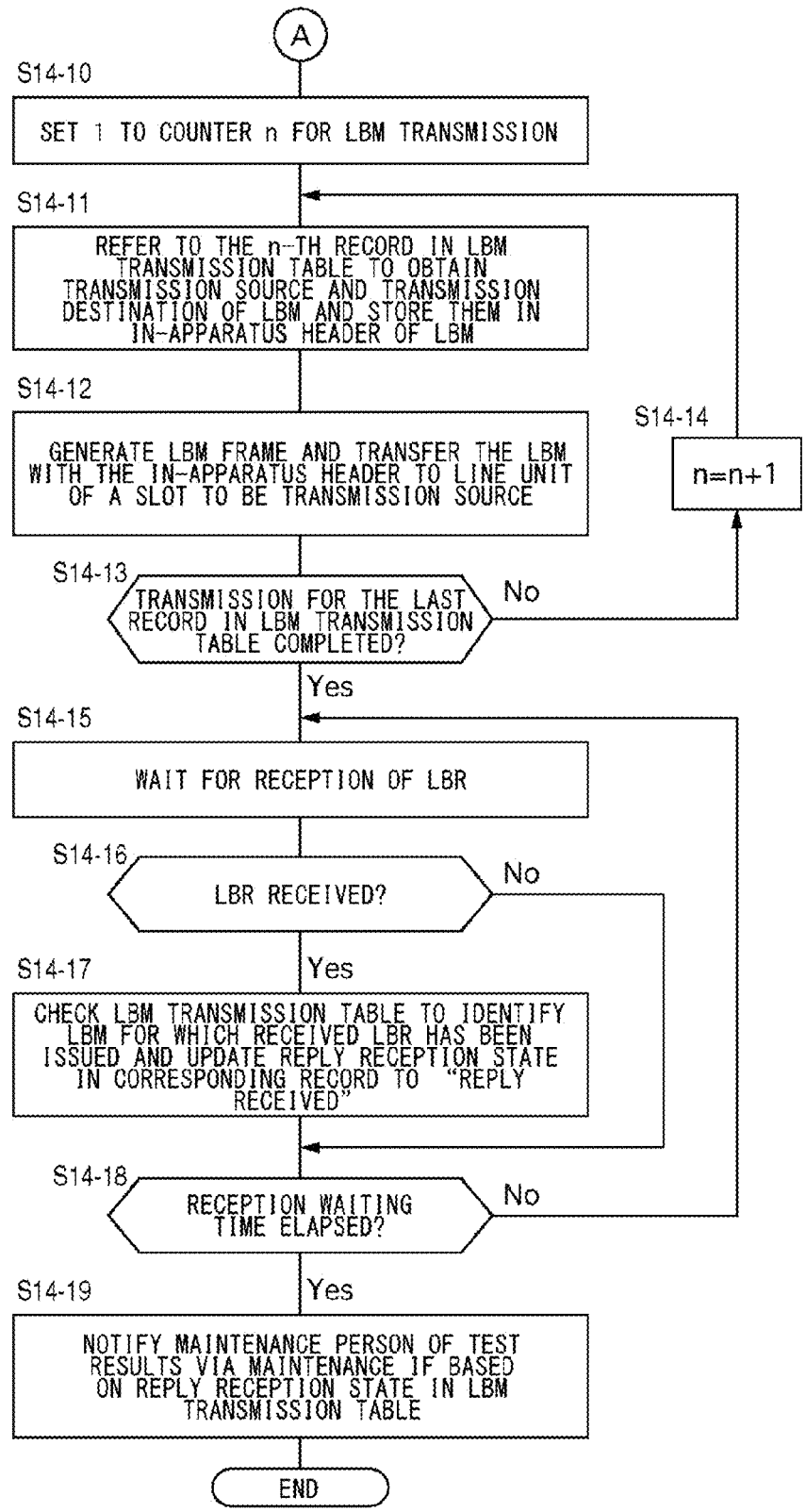
FIG. 16B is a flowchart that also shows the operational process of the frame transmission apparatus.

FIGS. 16A and 16B are flowcharts that show an operational process of the frame transmission apparatus 50. Also, FIG. 17 corresponds to FIG. 2 and schematically shows a network for a Layer 2 data communication service according to the first embodiment. For the switch 2 shown in FIG. 17, trunks are configured as shown in FIG. 10. More specifically, there is provided a trunk 1 that bundles the port 1 in the line unit 51 of the slot 1 (hereinafter, "S1P1") and the port 1 in the line unit 52 of the slot 2 (hereinafter, "S2P1"). There is also provided a trunk 2 that bundles the port 4 in the line unit 51 of the slot 1 (hereinafter, "S1P4"), the port 4 in the line unit 52 of the slot 2 (hereinafter, "S2P4"), and the port 4 in the line unit 53 of the slot 3 (hereinafter, "S3P4"). Also, a connection is provided between the trunk 1 and trunk 2, and an Up MEP set for the trunk 1 and an Up MEP set for the trunk 2 face each other within the switch 2.

Figure 17:
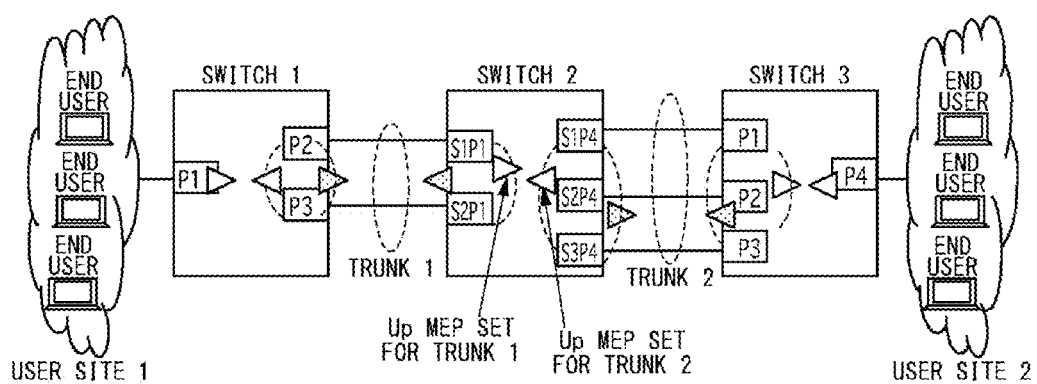
FIG. 17 is a schematic diagram of a network for a Layer 2 data communication service.

FIG. 18 show connection setting tables in the switch 2 shown in FIG. 17. FIG. 18A shows the connection setting table 201 in the line unit 51 of the slot 1, FIG. 18B shows that in the line unit 52 of the slot 2, and FIG. 18C shows that in the line unit 53 of the slot 3. The trunk 1 and the physical ports that belong to the trunk 1 are assigned the VLAN-ID 100, and the trunk 2 and the physical ports that belong to the trunk 2 are assigned the VLAN-ID 200.

FIGS. 16A and 16B show the operations executed by the CPU 55a in the setting control unit 55 according to an instruction for a loopback test provided by a maintenance person in order to check the normality of a frame transfer path (frame transfer state) based on a connection within the frame transmission apparatus. In the following description of the flowcharts, it is assumed that the switch 2 shown in FIG. 17 receives from a maintenance person an instruction for performing a loopback test starting from the Up MEP in the trunk 1. As shown in FIG. 18, for an in-apparatus connection set in advance for the switch 2, the trunk 2 is designated as the transfer destination of an LBM, and, as shown in FIG. 17, an Up MEP is also set in advance for the trunk 2.

The setting control unit 55 receives a request for a loopback test from a maintenance person's terminal via the maintenance IF 55c (S14-1). The request includes designation of a port set as the starting point of the test, designation of a VLAN-ID, and designation of the condition that an Up MEP is set as the starting point. Typically, a maintenance person specifies a trunk ID when the port to be the starting point of the test is associated with link aggregation (i.e., a logical port). The setting control unit 55, which retains in advance a list containing trunk IDs and combinations of a slot number and a physical port, then refers to the list and determines whether the port set as the starting point of the test is designated with a trunk ID or with a slot number and a physical port number.

If the port is designated with a trunk ID (Yes at S14-2), the setting control unit 55 will refer to the link aggregation composition table 202 and acquire information on all physical ports that belong to the trunk. The setting control unit 55 will then store multiple combinations of a slot number and a physical port number as information on the transmission source port of an LBM (S14-3). If the port to be the starting point of the test is designated with a slot number and a physical port number instead of a trunk ID (No at S14-2), the setting control unit 55 will store the single combination as information on the transmission source port of an LBM (S14-4). Even when a trunk is set as the port to be the starting point of the test, or even when the starting point of the test is a logical port configured by link aggregation, the maintenance person may explicitly specify a slot number and a physical port number belonging to the trunk. If a trunk is set as the port to be the starting point of the test but a slot number and a physical port number are explicitly specified by the maintenance person, the setting control unit 55 will only select the specified slot and physical port belonging to the trunk as the transmission source.

The setting control unit 55 refers to the connection setting table 201 (FIG. 18) for a line unit stored in a slot specified by a slot number (hereinafter, such a line unit will also be referred to as a "specified line unit"). Based on the information on the port to be the starting point of the test (such as a port number) and the VLAN-ID, the setting control unit 55 acquires information on the transfer destination port related to the information (S14-5). The setting control unit 55 then determines whether or not the information on the transfer destination port is a trunk ID. If the information is a trunk ID (Yes at S14-6), the setting control unit 55 will refer to the link aggregation composition table 202 (FIG. 12) for the specified line unit and acquire information on all physical ports that belong to the trunk. The setting control unit 55 will then store multiple combinations of a slot number and a physical port number as information on the transmission destination port of an LBM (S14-7). If the information on the transfer destination port is a combination of a slot number and a physical port number instead of a trunk ID (No at S14-6), the setting control unit 55 will store the single combination as information on the transmission destination port of an LBM (S14-8).

The setting control unit 55 generates an LBM transmission table based on the information on the LBM transmission source port and the information on the LBM transmission destination port stored at the aforementioned steps and stores the table in the memory 55b (S14-9). FIG. 19 shows an LBM transmission table. FIG. 19 shows an example of a table generated in a loopback test in which the transmission source is set to the trunk with the trunk ID 1 and the transmission destination is set to the trunk with the trunk ID 2 when link aggregations are configured as shown in FIG. 10. A number field contains a number indicating the order of LBM transmission. Although multiple LBMs are serially transmitted one by one in the embodiment, they may be transmitted simultaneously in parallel.

A transmission source field in the LBM transmission table contains a slot number and a physical port number as an LBM transmission source. Also, a transmission destination field contains a slot number and a physical port number as an LBM transmission destination. In FIG. 19, a slot number is denoted by Sn, and a physical port number is denoted by Pn, as shown in FIG. 17. A reply reception state field contains a value that indicates whether or not an LBR has been received after the transmission of an LBM. At the time of transmission of an LBM, the field contains "no reply" as the initial value.

In this way, the setting control unit 55 develops a single logical port by link aggregation to multiple physical ports and generates an LBM transmission table so as to cover multiple combinations of a transmission source physical port and a transmission destination physical port. For example, by multiplying 2 transmission source physical ports by 3 transmission destination physical ports, 6 records are created in FIG. 19. Accordingly, the normality of 6 frame transfer paths used for frame transfer from the trunk 1 to the trunk 2 is thoroughly checked, using 6 LBMs for the 6 records. In addition, by checking the reception state of an LBR, which is a reply to an LBM, the normality of 6 frame transfer paths used for frame transfer from the trunk 2 to the trunk 1 is also checked at the same time.

Next, as shown in FIG. 16B, the setting control unit 55 initializes a counter n for counting the number of transmitted LBMs to 1 (S14-10). Subsequently, the setting control unit 55 generates an LBM including an in-apparatus header in which the transmission source information and the transmission destination information specified in the n-th record in the LBM transmission table are stored (S14-11). The setting control unit 55 then transmits the LBM to a corresponding line unit stored in the slot specified by the slot number (S14-12). Until the transmission of LBMs, which are equal in number to the records in the LBM transmission table or to the combinations of a slot and a physical port of the transmission source and a slot and a physical port of the transmission destination (6 in FIG. 19), is completed (No at S14-13), the counter n is incremented by one (S14-14) and the process returns to S14-11. When LBMs equal in number to the records in the LBM transmission table have been transmitted (Yes at S14-13), the process proceeds to S14-15.

The setting control unit 55 waits for a predetermined period of time, such as for 3 seconds, to see if a notice for acknowledging an LBR as a reply to an LBM is transferred from a line unit (S14-15). If an LBR is transferred from a line unit during the period of time (Yes at S14-16), the setting control unit 55 will refer to the information in the in-apparatus header of the LBR to identify an LBM to which the LBR has been issued as a reply. As will be described later, the transmission source information (a slot number and a physical port number) and the transmission destination information in an LBR are set by interchanging the transmission source information and the transmission destination information in a relevant LBM. Therefore, if the transmission destination information in an LBR matches the transmission source information in a specific record of the LBM transmission table and if the transmission source information in the LBR matches the transmission destination information in the specific record of the LBM transmission table, the LBR may be identified as a reply to the LBM for the specific record.

Thereafter, the setting control unit 55 updates the LBM record for which an LBR has been received in the LBM transmission table by changing the reply reception state therein to "reply received" (S14-17). If a notification for acknowledging an LBR is not transferred from a line unit (No at S14-16), the process of S14-17 will be skipped. FIG. 20 shows an example of an LBM transmission table in which the reply reception state fields have been updated. If the reception waiting time, such as 3 seconds, has not elapsed yet (No at S14-18), the process will return to S14-15. When the reception waiting time has elapsed (Yes at S14-18), the setting control unit 55 notifies, via the maintenance IF 55c, the maintenance person's terminal of the information indicating the reply reception state for each LBM as a result of the loopback test (S14-19). For example, the setting control unit 55 may transmit to the maintenance person's terminal the data of a screen showing the reply reception state for each of multiple in-apparatus paths that relate the transmission sources and the transmission destinations in the loopback test, as shown in FIG. 20, or a test result file in which the reply reception state for each of the paths is recorded, so that the maintenance person can check the test result.

In this way, even if a trunk is configured on the starting point side of a loopback test, a maintenance person can check the normality of multiple frame transmission paths corresponding to all the combinations with the physical ports belonging to the trunk, by once specifying the trunk ID and starting a loopback test. Similarly, even if a trunk is configured on the return point side of a loopback test, a maintenance person can also check the normality of multiple frame transmission paths corresponding to all the combinations with the physical ports belonging to the trunk, by once starting a loopback test without regard to the physical ports belonging to the trunk.

For example, when the reply reception state as shown in FIG. 20 is provided as a test result, the maintenance person can understand that, in the switch 2, at least one of the LBM transfer path and the LBR transfer path between the port 1 in the slot 1 and the port 4 in the slot 3 has a problem. The maintenance person can also understand that at least one of the LBM transfer path and the LBR transfer path between the port 1 in the slot 2 and the port 4 in the slot 2 has a problem. This can support prompt maintenance work. Especially, in the case of a chassis-based apparatus, reporting the normality of each frame transfer path can support replacement of a unit related to a defective frame transfer path.

Although the example of FIG. 19 shows the case where both the LBM transmission source and the LBM transmission destination are trunks, the process shown in the flowcharts of FIGS. 16A and 16B is also applicable even when only one of the LBM transmission source and the LBM transmission destination is a trunk or even when neither is a trunk. Also, as shown at S14-2—Yes and S14-4 in the flowchart, even when the transmission source of an LBM is a trunk, a maintenance person can explicitly designate a specific slot number and physical port number instead of a trunk, so that a loopback test exclusive to a specific section can be performed.

Figure 21:
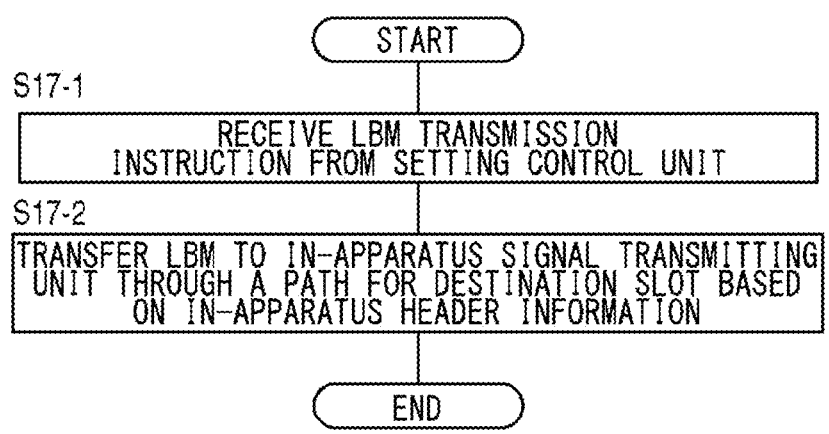
FIG. 21 is a flowchart that shows another operational process of the frame transmission apparatus.

FIG. 21 is a flowchart that shows another operational process of the frame transmission apparatus 50. This figure shows the operation of the input frame processing unit 111 in each line unit (line unit 51, line unit 52, and line unit 53) to process an LBM transferred from the setting control unit 55. The input frame processing unit 111 receives the data of an LBM transferred from the setting control unit 55 and a transmission instruction for the LBM (S17-1). The input frame processing unit 111 then refers to the in-apparatus header of the received LBM to identify a slot number to which the LBM is to be output and transfers the LBM with the in-apparatus header added thereto to an in-apparatus signal transmitting unit 113 related in advance to the slot number (S17-2). Accordingly, the LBM is transmitted to a line unit of the transmission destination via an in-apparatus path (backboard 54).

Figure 22:
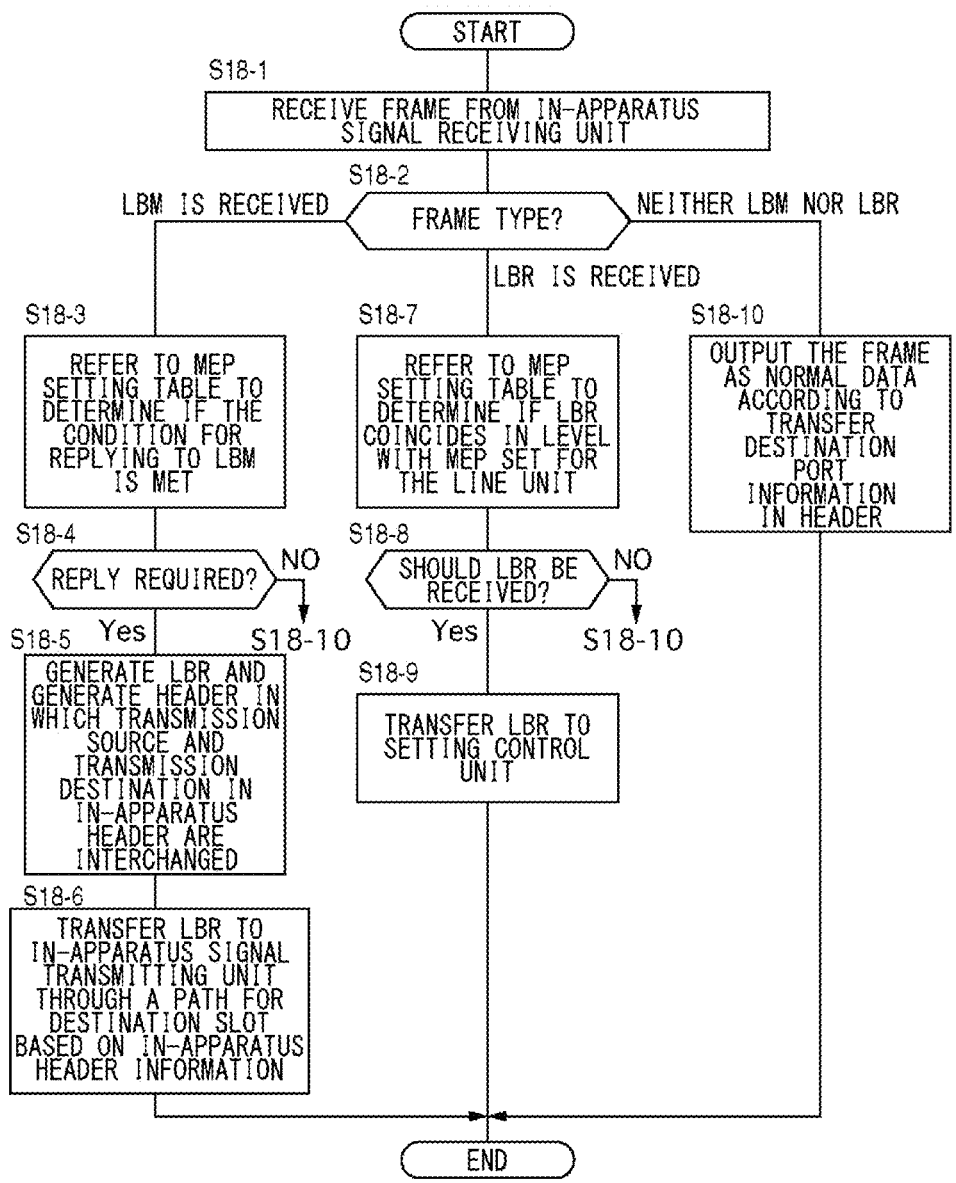
FIG. 22 is a flowchart that shows yet another operational process of the frame transmission apparatus.

FIG. 22 is a flowchart that shows yet another operational process of the frame transmission apparatus 50. This figure shows the operation of the output frame processing unit 115 in each line unit to process an LBM or an LBR transferred via the backboard 54. The output frame processing unit 115 receives a frame transmitted through an in-apparatus path via the in-apparatus signal receiving unit 114 (S18-1). The output frame processing unit 115 then checks the EtherType value in the received frame to determine whether the received frame is an LBM or an LBR as a maintenance management frame, or a frame other than a maintenance management frame (typically a user frame) (S18-2). If it is determined that the received frame is a frame other than a maintenance management frame at S18-2, the output frame processing unit 115 will output the frame to the outside of the apparatus via a port specified in the in-apparatus header of the received frame (S18-10).

If it is determined that the received frame is an LBM at S18-2, the output frame processing unit 115 will refer to the MEP setting table 203 (FIG. 14) to further determine whether or not a MEP is set for the combination of a transfer destination port and a VLAN specified in the in-apparatus header of the LBM (S18-3). In the MEP setting table 203 for the line unit 51 of the slot 1 in the present embodiment, the record containing the physical port "4", the transmission VLAN-ID "200", the MEP setting "set", and the MEP level "2" may be provided as information on a MEP set for the trunk 2, for example. A similar record may also be provided in the MIP setting table 204.

If a MEP is set and if the level of the received LBM coincides with the level of the MEP, the output frame processing unit 115 will determine to reply to the LBM. On the other hand, if a MEP is not set or if the level of the MEP is lower than the level of the received LBM, the output frame processing unit 115 will determine not to reply to the LBM. When the output frame processing unit 115 determines not to reply to the LBM (No at S18-4), the process proceeds to S18-10 and the LBM is output to the outside of the apparatus. Although not shown in FIG. 22, if the level of the MEP is higher than the level of the received LBM, the received LBM will be discarded.

When it determines to reply to the LBM (Yes at S18-4), the output frame processing unit 115 generates an LBR as reply data for the LBM. At the time, the output frame processing unit 115 prepares an in-apparatus header for the LBR in which the transmission source information and the transmission destination information in the in-apparatus header of the received LBM are interchanged, and adds the prepared in-apparatus header to the LBR (S18-5). More specifically, the output frame processing unit 115 sets the transmission source information in the in-apparatus header of the LBM as the transmission destination information in the in-apparatus header of the LBR, and sets the transmission destination information in the in-apparatus header of the LBM as the transmission source information in the in-apparatus header of the LBR. According to the information in the in-apparatus header, the output frame processing unit 115 then transfers the data of the LBR to an in-apparatus signal transmitting unit 113 related in advance to the slot number of the transmission destination (S18-6). Although not shown in FIG. 22, a transmission VLAN-ID to be set in the in-apparatus header of the LBR can be obtained by referring to the connection setting table based on the transmission destination port and VLAN-ID stored in the in-apparatus header of the LBM. The output frame processing unit 115 may set the transmission VLAN-ID obtained as stated above in the in-apparatus header of the LBR.

In this way, by setting the transmission source of an LBM as the transmission destination of an LBR, the LBR is transferred through a path opposite to the transfer direction of the LBM within the apparatus. More specifically, the LBR is transmitted, via an in-apparatus path (backboard 54), to a line unit provided with a port designated as the transmission destination of the LBR, and the line unit is the transmission source of the LBM. The line unit of the transmission source of the LBM then performs processes at S18-7 and the subsequent steps in FIG. 22.

If it is determined that the received frame is an LBR at S18-2, the output frame processing unit 115 will refer to the MEP setting table 203 (FIG. 14) to further determine whether or not a MEP is set for the combination of a transfer destination port and a VLAN specified in the in-apparatus header of the LBR (S18-7). If a MEP is set and if the level of the received LBR coincides with the level of the MEP, the output frame processing unit 115 will determine that the LBR should be received at the MEP. On the other hand, if a MEP is not set or if the level of the MEP is lower than the level of the received LBR, the output frame processing unit 115 will determine that the LBR should not be received. When it is determined that the LBR should not be received (No at S18-8), the process proceeds to S18-10. Although not shown in FIG. 22, if the level of the MEP is higher than the level of the received LBR, the received LBR will be discarded.

When it is determined that the LBR should be received at the MEP set for a port in the line unit (Yes at S18-8), the output frame processing unit 115 transfers the LBR with the in-apparatus header to the setting control unit 55 (S18-9). As stated previously, according to an LBR provided by the output frame processing unit 115, the setting control unit 55 sequentially updates the reply reception state in the LBM transmission table.

Although the LB is used among OAM functions and a loopback frame is used as a maintenance management frame in the embodiment, it will be obvious to those skilled in the art that the method for checking the frame transmission state within an apparatus is not limited to the LB. For example, the normality of an in-apparatus path may be checked for each direction using the CC function among OAM functions. In this case, the setting control unit 55 may generate, in the LBM transmission table, a field for containing the frame transmission state for each frame transfer direction and may further provide, in the table shown in FIG. 19, records in which the transmission sources and the transmission destinations are interchanged, for example. Upon reception of a CC frame, the output frame processing unit 115 in the line unit of the transmission destination of the CC frame notifies the setting control unit 55 of the information on the CC frame, and the setting control unit 55 may update the frame transmission state in the LBM transmission table for each transfer direction of the CC frame, accordingly.

(Second Embodiment)

Figure 23:
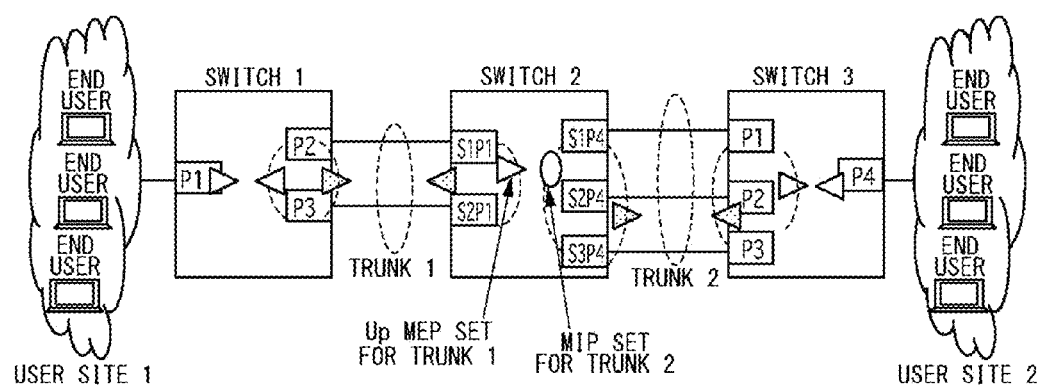
FIG. 23 is a schematic diagram of a network for a Layer 2 data communication service.

FIG. 23 is a schematic diagram of a network for a Layer 2 data communication service in the second embodiment. A frame transmission apparatus according to the second embodiment differs from the frame transmission apparatus according to the first embodiment in that the return point of a loopback is a MIP set for a trunk, as shown in the switch 2 in FIG. 23. The other conditions are the same as defined in the first embodiment.

Figure 24:
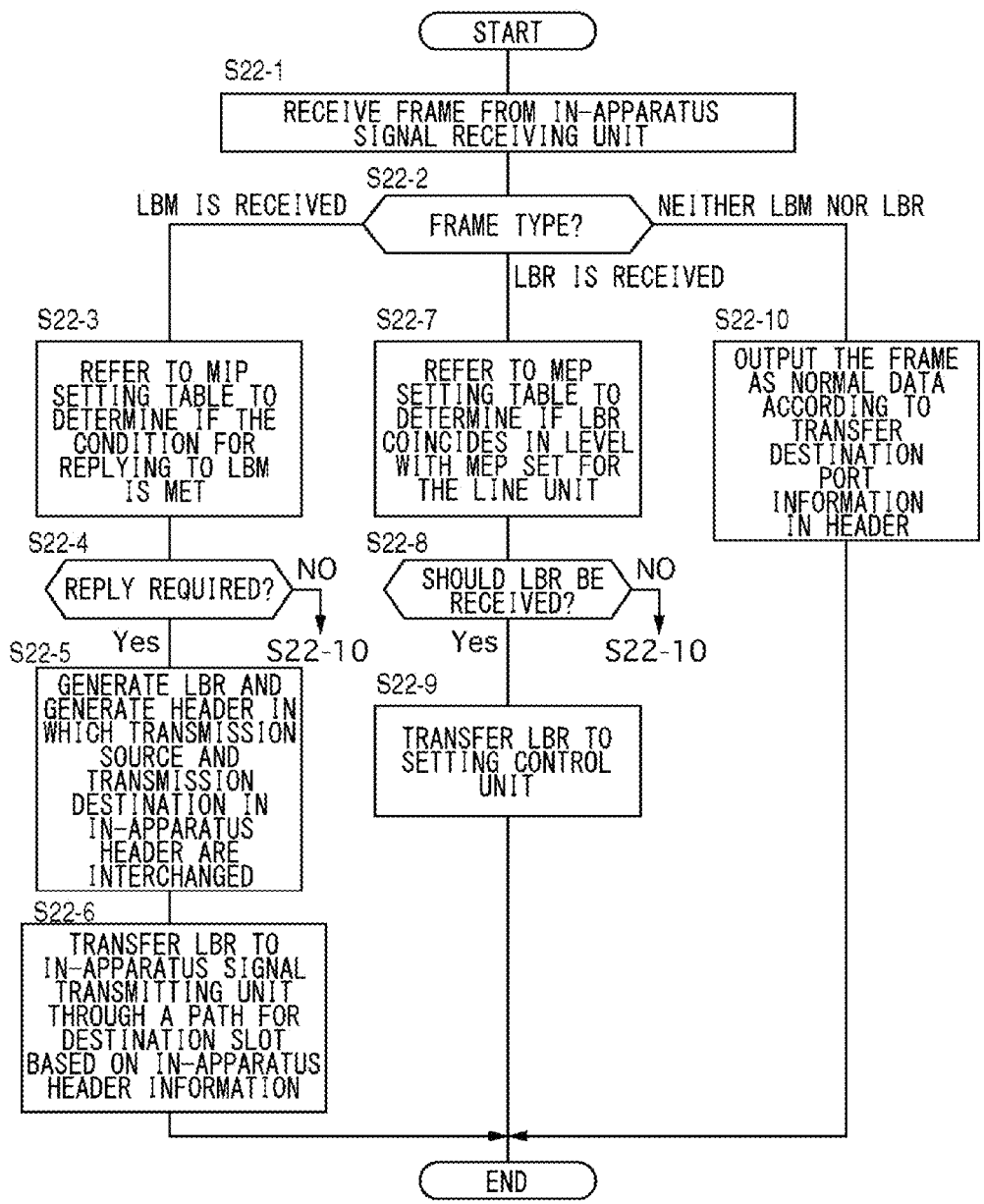
FIG. 24 is a flowchart that shows an operational process of another frame transmission apparatus.

FIG. 24 is a flowchart that shows an operational process of the frame transmission apparatus according to the second embodiment and particularly shows the operation of the output frame processing unit 115 in a line unit. FIG. 24 corresponds to FIG. 22, and S22-1 to S22-10 in FIG. 24 correspond to S18-1 to S18-10 in FIG. 22. In FIG. 24, S22-3 is the only part different from the flowchart of FIG. 22, and the other parts are the same as shown in FIG. 22.

If it is determined that the received frame is an LBM at S22-2, the output frame processing unit 115 will refer to the MIP setting table 204 (FIG. 15) to further determine whether or not a MIP is set for the combination of a transfer destination port and a VLAN specified in the in-apparatus header of the LBM (S22-3). When a MIP is set, if the level of the received LBM coincides with the level of the MIP and if the destination MAC address of the LBM coincides with the MAC address of the transfer destination port, the output frame processing unit 115 will determine to reply to the LBM (Yes at S22-4) and the process will proceed to S22-5. On the other hand, if a MIP is not set, if the level of the received LBM does not coincide with the level of the MIP, or if the destination MAC address of the LBM does not coincide with the MAC address of the transfer destination port, the output frame processing unit 115 will determine not to reply to the LBM (No at S22-4) and the process will proceed to S22-10.

Thus, as the return point in a loopback test using an LBM, a MIP can also be set instead of a MEP. Namely, using the technique proposed in the first embodiment and the technique proposed in the second embodiment, a frame transmission apparatus in which MEPs and MIPs are set in various modes can be handled, and the normality of a frame transmission path within the apparatus can be efficiently checked.

(Third Embodiment)

The third embodiment describes a process performed by the frame transmission apparatus 50 in the case where the apparatus receives from a maintenance person an instruction for a loopback test in which a slot number and a port number are explicitly designated as the transfer destination of an LBM. The other conditions are the same as defined in the first embodiment.

Figure 25:
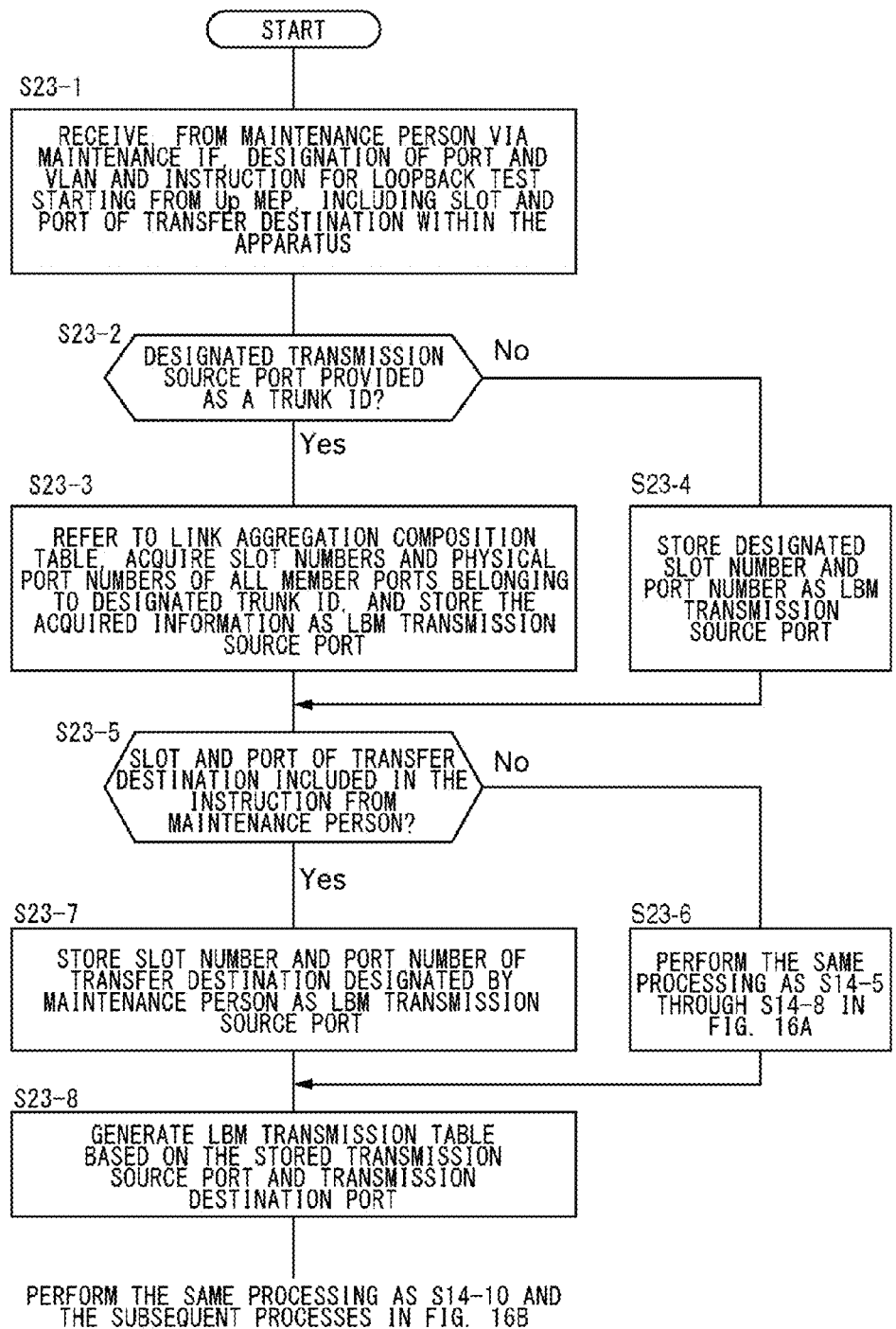
FIG. 25 is a flowchart that shows another operational process of the frame transmission apparatus.

FIG. 25 is a flowchart that shows an operational process of the frame transmission apparatus according to the third embodiment and particularly shows the operation of the setting control unit 55. FIG. 25 corresponds to FIG. 16A. More specifically, S23-1 to S23-4 in FIG. 25 correspond to S14-1 to S14-4 in FIG. 16A, and S23-8 in FIG. 25 corresponds to S14-9 in FIG. 16A. However, at S23-1, an instruction for a test provided by a maintenance person may include designation of the transfer destination. More specifically, the instruction may include designation of a slot number and a physical port number indicating the transmission destination of a loopback frame, which is the return point in the loopback test within the apparatus.

After the process at S23-3 or S23-4 is performed, the setting control unit 55 determines if a slot number and a physical port number of the LBM transfer destination are designated in the instruction for a test from the maintenance person. If a slot number and a physical port number of the LBM transfer destination are designated (Yes at S23-5), the setting control unit 55 will store the transfer destination information thus designated as the LBM transfer destination (S23-7). On the other hand, if a slot number and a physical port number of the LBM transfer destination are not designated (No at S23-5), the setting control unit 55 will perform the processes of S14-5 through S14-8 in FIG. 16A (S23-6). Namely, the slot number and physical port number of the transmission destination are automatically determined with reference to the connection setting table 201 and the link aggregation composition table 202. When the transmission destination is provided as a trunk ID, multiple physical ports belonging to the trunk are automatically determined as the LBM transfer destination. Subsequent operations are the same as those in the frame transmission apparatus 50 according to the first embodiment.

Thus, when a maintenance person explicitly designates the transfer destination of an LBM, a test can be performed in which only an in-apparatus section of which the normality need be checked is directly designated. When a maintenance person does not designate the transfer destination of an LBM, on the other hand, the frame transmission apparatus 50 autonomously determines the LBM transfer destination so that multiple frame transmission paths within the apparatus are covered, according to the connection settings and the configuration of link aggregation.

By combining the first embodiment and the third embodiment, the following processing is enabled. Namely, in the case where trunks are configured in both the transmission source and the transmission destination of an LBM and a maintenance person designates a specific physical port in one of the trunks and does not designate a port in the other trunk, the setting control unit 55 generates the LBM transmission table so as to cover all the combinations of the specific physical port designated by the maintenance person and one of multiple physical ports belonging to the other trunk for which no designation is provided, and controls transmission of multiple LBMs and LBRs. Also, in the case where trunks are configured in both the transmission source and the transmission destination of an LBM and a maintenance person designates a specific physical port in each of the trunks, the setting control unit 55 controls transmission of a single LBM and a single LBR between the specific physical port designated among multiple physical ports belonging to the trunk of the transmission source and the specific physical port designated among multiple physical ports belonging to the trunk of the transmission destination.

The present invention has been described with reference to the first through third embodiments. The embodiments are intended to be illustrative only, and it will be obvious to those skilled in the art that various modifications to constituting elements or processes could be developed and that such modifications also fall within the scope of the present invention.

For example, although Ethernet OAM defined in ITU-T Y.1731 is employed as an example in the first through third embodiments, the technique to which the embodiments are applicable is not limited thereto. It will be obvious to those skilled in the art that the embodiments are also applicable to an Up MEP and a MIP in the Pseudowire layer in MPLS-TP OAM defined in ITU-T G.8113.1, for example.

Optional combinations of the aforementioned first through third embodiments and modifications may also be practiced as additional embodiments of the present invention. Such an additional embodiment provided by a combination has each of the effects of the embodiments and modifications combined. It will be obvious to those skilled in the art that the function to be achieved by each constituent feature described in the claims may be implemented by each of the constituting elements described in the first through third embodiments or modifications, or by the cooperation of those constituting elements.

What is claimed is:
1. A frame transmission apparatus, comprising:
a first port;
a second port; and
a controller configured to check connectivity between the first port and the second port by transferring a predetermined maintenance management frame from the first port to the second port, wherein, when the first port is a logical port configured by logically bundling a plurality of physical ports by link aggregation, the controller selects each of the plurality of physical ports as a transmission source port and transfers a plurality of maintenance management frames from the plurality of physical ports to the second port.

2. A frame transmission apparatus, comprising:
a first port;
a second port; and
a controller configured to check the connectivity between the first port and the second port by transferring a predetermined maintenance management frame from the first port to the second port,
wherein, when the second port is a logical port configured by logically bundling a plurality of physical ports by link aggregation, the controller selects each of the plurality of physical ports as a transmission destination port and transfers a plurality of maintenance management frames from the first port to the plurality of physical ports.

3. The frame transmission apparatus of claim 2, wherein:
the maintenance management frame is a loopback message; and
the frame transmission apparatus further comprises a frame processor configured to receive the loopback message at a maintenance function point set in the second port and to transmit a loopback reply in which the first port is designated as the transmission destination, from a physical port designated as the transmission destination in the loopback message, in a direction opposite to the transfer direction of the loopback message.

4. A frame transmission apparatus, comprising:
a first port;
a second port; and
a controller configured to check the connectivity between the first port and the second port by transferring a predetermined maintenance management frame from the first port to the second port, wherein,
when each of the first port and the second port is a logical port configured by logically bundling a plurality of physical ports by link aggregation, the controller selects each of a plurality of physical ports belonging to the first port as a transmission source port, selects each of a plurality of physical ports belonging to the second port as a transmission destination port, and transfers a plurality of maintenance management frames so as to cover all the combinations of a transmission source physical port and a transmission destination physical port.

5. The frame transmission apparatus of claim 4, wherein:
the maintenance management frame is a loopback message; and
the frame transmission apparatus further comprises a frame processor configured to receive the loopback message at a maintenance function point set in the second port and to transmit a loopback reply in which a physical port designated as the transmission source in the loopback message is designated as the transmission destination, from a physical port designated as the transmission destination in the loopback message, in a direction opposite to the transfer direction of the loopback message.

6. A frame transmission apparatus, comprising:
a first port;
a second port; and
a controller configured to check the connectivity between the first port and the second port by transferring a predetermined maintenance management frame from the first port to the second port, wherein:
the first port is a logical port configured by logically bundling a plurality of physical ports by link aggregation; and,
when receiving, from a maintenance person, designation of a specific physical port among the plurality of physical ports as the transmission source port of the maintenance management frame, the controller transfers the maintenance management frame from the specific physical port to the second port.

7. The frame transmission apparatus of claim 1, wherein:
the maintenance management frame is a loopback message; and
the frame transmission apparatus further comprises a frame processor configured to receive the loopback message at a maintenance function point set in the second port and to transmit a loopback reply in which a physical port designated as the transmission source in the loopback message is designated as the transmission destination, in a direction opposite to the transfer direction of the loopback message.

8. The frame transmission apparatus of claim 7, wherein the frame processor receives the loopback message at a maintenance intermediate point (MIP) set in the second port and transmits the loopback reply in a direction opposite to the transfer direction of the loopback message.

9. A frame transmission apparatus, comprising:
a first port;
a second port; and
a controller configured to check the connectivity between the first port and the second port by transferring a predetermined maintenance management frame from the first port to the second port, wherein:
the second port is a logical port configured by logically bundling a plurality of physical ports by link aggregation; and, when receiving, from a maintenance person, designation of a specific physical port among the plurality of physical ports as the transmission destination port of the maintenance management frame, the controller transfers the maintenance management frame from the first port to the specific physical port.

10. A frame transmission apparatus, comprising:
a first port;
a second port; and
a controller configured to check the connectivity between the first port and the second port by transferring a predetermined maintenance management frame from the first port to the second port, wherein:
each of the first port and the second port is a logical port configured by logically bundling a plurality of physical ports by link aggregation; and,
when receiving, from a maintenance person, designation of a specific physical port in one of the first port and the second port as the transmission source port or the transmission destination port of the maintenance management frame, the controller transfers a plurality of maintenance management frames so as to cover all the combinations of the specific physical port designated by the maintenance person and one of a plurality of physical ports belonging to the other logical port for which no designation is provided.

11. A frame transmission apparatus, comprising:
a first port;
a second port; and a controller configured to check the connectivity between the first port and the second port by transferring a predetermined maintenance management frame from the first port to the second port, wherein:

each of the first port and the second port is a logical port configured by logically bundling a plurality of physical ports by link aggregation; and, when receiving, from a maintenance person, designation of a specific physical port among a plurality of physical ports belonging to the first port as the transmission source port of the maintenance management frame and designation of a specific physical port among a plurality of physical ports belonging to the second port as the transmission destination port of the maintenance management frame, the controller transfers the maintenance management frame from the transmission source physical port to the transmission destination physical port as designated by the maintenance person.

12. A method for checking connectivity in a frame transmission apparatus provided with a plurality of ports, the method comprising:

transferring a predetermined maintenance management frame from a first port to a second port provided in the apparatus, the transferring further including when each of the first port and the second port is a logical port configured by logically bundling a plurality of physical ports by link aggregation:

selecting each of a plurality of physical ports belonging to the first port as a transmission source port;

selecting each of a plurality of physical ports belonging to the second port as a transmission destination port; and transferring a plurality of maintenance management frames so as to cover all the combinations of a transmission source physical port and a transmission destination physical port.

* * * * *